US012620347B2

(12) United States Patent
Kim et al.

(10) Patent No.: US 12,620,347 B2
(45) Date of Patent: May 5, 2026

(54) DISPLAY APPARATUS AND METHOD FOR CONTROLLING THE SAME

(71) Applicant: SAMSUNG ELECTRONICS CO., LTD., Suwon-si (KR)

(72) Inventors: Jinho Kim, Suwon-si (KR); Seongjoon Jeong, Suwon-si (KR); Jinhyuk Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/928,892

(22) Filed: Oct. 28, 2024

(65) Prior Publication Data

US 2025/0225916 A1 Jul. 10, 2025

Related U.S. Application Data

(63) Continuation of application No. PCT/KR2024/015583, filed on Oct. 15, 2024.

(30) Foreign Application Priority Data

Jan. 5, 2024 (KR) ........................ 10-2024-0002519
Jul. 24, 2024 (KR) ........................ 10-2024-0098218

(51) Int. Cl.
*G09G 3/32* (2016.01)

(52) U.S. Cl.
CPC ......... *G09G 3/32* (2013.01); *G09G 2300/026* (2013.01); *G09G 2360/04* (2013.01)

(58) Field of Classification Search
CPC ..................... G09G 2300/026; G09G 2360/04
See application file for complete search history.

(56) References Cited

U.S. PATENT DOCUMENTS 10,431,149 B2 10/2019 Hyeon
10,580,351 B2 3/2020 An
(Continued)

FOREIGN PATENT DOCUMENTS

JP 2019-47224 3/2019
KR 10-2018-0008205 1/2018
(Continued)

OTHER PUBLICATIONS

International Search Report and the Written Opinion of the International Searching Authority dated Feb. 12, 2025 for International Application No. PCT/KR2024/015583.

*Primary Examiner* — Bipin Gyawali
(74) *Attorney, Agent, or Firm* — STAAS & HALSEY LLP

(57) ABSTRACT

A display apparatus including first and second display modules arranged adjacently with a boundary line therebetween; and a controller configured to control first pixels of the first display module and second pixels of the second display module based on image data, wherein the first pixels include first boundary pixels adjacent to the boundary line, the second pixels include second boundary pixels adjacent to the boundary line, each first boundary pixel and each second boundary pixel includes a plurality of light-emitting elements including a first light-emitting element at a first location to output light of a first color, and a second light-emitting element at a second location further from the boundary line to output light of a second color, and the controller is configured to adjust luminances of the first and second light-emitting elements according to reference luminances of the first and second light-emitting element determined based on the image data.

15 Claims, 15 Drawing Sheets

(56) References Cited

U.S. PATENT DOCUMENTS

| | | | | |
|---|---|---|---|---|
| 10,719,288 | B2 | 7/2020 | Jung et al. | |
| 10,879,320 | B2 | 12/2020 | Zhu et al. | |
| 11,404,026 | B2 | 8/2022 | Kim et al. | |
| 11,645,985 | B2 * | 5/2023 | Jeong | G09G 3/3426 345/102 |
| 11,837,157 | B2 * | 12/2023 | Oh | G09F 9/302 |
| 11,955,045 | B2 | 4/2024 | Kim et al. | |
| 2007/0102622 | A1 * | 5/2007 | Olsen | G03B 35/08 250/208.1 |
| 2010/0265160 | A1 | 10/2010 | Hajjar | |
| 2018/0040271 | A1 * | 2/2018 | Jung | G06F 3/1446 |
| 2018/0166007 | A1 * | 6/2018 | Hyeon | G06F 3/1446 |
| 2020/0226969 | A1 * | 7/2020 | Jun | G09G 5/14 |
| 2020/0226990 | A1 * | 7/2020 | Jun | G09G 5/14 |
| 2021/0027741 | A1 * | 1/2021 | Suzuki | G09G 5/393 |
| 2022/0013083 | A1 | 1/2022 | Cheng et al. | |
| 2022/0115456 | A1 * | 4/2022 | Oh | H10K 59/352 |
| 2023/0012711 | A1 * | 1/2023 | Kim | H01L 25/0753 |
| 2023/0196976 | A1 * | 6/2023 | Park | G09G 3/2096 345/214 |
| 2023/0237955 | A1 | 7/2023 | Kuo | |
| 2023/0238363 | A1 * | 7/2023 | Lin | G09G 3/32 257/89 |
| 2023/0252916 | A1 | 8/2023 | Jin et al. | |

FOREIGN PATENT DOCUMENTS

| | | |
|---|---|---|
| KR | 10-2018-0015553 | 2/2018 |
| KR | 10-2022-0028513 | 3/2022 |
| KR | 10-2022-0030509 | 3/2022 |
| KR | 10-2022-0152975 | 11/2022 |
| KR | 10-2569732 | 8/2023 |
| KR | 10-2581190 | 9/2023 |
| KR | 10-2023-0141695 | 10/2023 |
| WO | 2019/067500 | 4/2019 |

* cited by examiner

DISPLAY APPARATUS AND METHOD FOR CONTROLLING THE SAME

CROSS-REFERENCE TO RELATED APPLICATIONS

This application is a continuation application, claiming priority under § 365 (c), of International Application No. PCT/KR2024/015583, filed on Oct. 15, 2024, which is based on and claims the benefit of Korean Patent Application Number 10-2024-0002519, filed on Jan. 5, 2024, and Korean Patent Application Number 10-2024-0098218, filed on Jul. 24, 2024, the disclosures of which are incorporated by reference herein in their entireties.

TECHNICAL FIELD

The disclosure relates to a display apparatus that may control a luminance of light-emitting elements included in pixels of a plurality of display modules, and a method for controlling the same.

BACKGROUND ART

Display apparatuses may be classified into self-luminous displays where each pixel emits light by itself, and light-receiving displays that require a separate light source.

A Liquid Crystal Display (LCD), which is a representative light-receiving display, includes a backlight unit for supplying light from the rear of a display panel, a liquid crystal layer acting as a switch to pass/block light, and a color filter for changing the supplied light to a desired color. Accordingly, the LCD has a complex structure and has a limited implementation (e.g., small thickness).

On the other hand, a self-luminous display in which each pixel emits light by itself by including a light-emitting element for each pixel does not require components such as a backlight unit and a liquid crystal layer, and may exclude a color filter. Accordingly, the self-luminous display may have a simple structure and a high degree of design freedom. The self-luminous display may also realize thin thickness as well as excellent contrast ratio, luminance and viewing angle.

Among self-luminous displays, a micro Light-emitting Diode (LED) display includes a plurality of LEDs that are micro-sized. Compared to LCDs requiring backlight, the micro LED displays may provide superior contrast, response time, and energy efficiency.

In addition, micro LEDs, which are inorganic light-emitting elements, are brighter, have superior luminous efficiency, and have a longer lifespan than OLEDs requiring a separate encapsulation layer to protect organic materials.

Recently, a technology to enlarge a display apparatus by tiling display modules is being developed.

DISCLOSURE

Technical Problem

It is an aspect of the disclosure to provide a display apparatus that may compensate for a luminance of each of a plurality of light-emitting elements included in pixels adjacent to a boundary line between display modules, and a method for controlling the display apparatus.

Technical aspects that may be achieved by the disclosure are not limited to the above-mentioned aspects, and other technical aspects not mentioned will be clearly understood by one of ordinary skill in the technical art to which the disclosure belongs from the following description.

Technical Solution

Aspects of embodiments of the disclosure will be set forth in part in the description which follows and, in part, will be apparent from the description, or may be learned by practice of the presented embodiments.

According to an embodiment of the disclosure, a display apparatus includes a first display module including a plurality of first pixels; a second display module including a plurality of second pixels, and arranged adjacent to the first display module with a boundary line between the first display module and the second display module; and a controller configured to control the plurality of first pixels and the plurality of second pixels based on image data, wherein the plurality of first pixels includes a plurality of first boundary pixels adjacent to the boundary line, the plurality of second pixels includes a plurality of second boundary pixels adjacent to the boundary line, each first boundary pixel of the plurality of first boundary pixels and each second boundary pixel of the plurality of second boundary pixels includes a plurality of light-emitting elements including a first light-emitting element disposed at a first location closest to the boundary line and configured to output light of a first color, and a second light-emitting element disposed at a second location that is further from the boundary line than the first location and configured to output light of a second color, and the controller is configured to reduce a luminance of the first light-emitting element to be lower than a reference luminance of the first light-emitting element determined based on the image data, and increase a luminance of the second light-emitting element to be higher than a reference luminance of the second light-emitting element determined based on the image data.

According to an embodiment of the disclosure, the plurality of first boundary pixels may form a first boundary area. The plurality of first pixels may include a plurality of first internal area pixels disposed in a first internal area adjacent to the first boundary area. The plurality of second boundary pixels may form a second boundary area. The plurality of second pixels may include a plurality of second internal area pixels disposed in a second internal area adjacent to the second boundary area.

According to an embodiment of the disclosure, the first display module may include a first bezel area adjacent to the first internal area, and a first driver integrated circuit (IC) disposed in the first bezel area. The second display module may include a second bezel area adjacent to the second internal area, and a second driver IC disposed in the second bezel area.

According to an embodiment of the disclosure, the plurality of first boundary pixels and the plurality of first internal area pixels may be arranged in a vertical direction with the plurality of first boundary pixels between the boundary line and the plurality of first internal area pixels. The plurality of second boundary pixels and the plurality of second internal area pixels may be arranged in a vertical direction with the plurality of second boundary pixels between the boundary line and the plurality of second internal area pixels.

According to an embodiment of the disclosure, the controller may be configured to reduce the luminance of the first light-emitting element to be lower than the reference luminance of the first light-emitting element by a first ratio, and increase the luminance of the second light-emitting element to be higher than the reference luminance of the second light-emitting element by a second ratio. The first ratio may be preset based on a first measured luminance of the plurality of first internal area pixels measured by an external measurement device and a second measured luminance of the first light-emitting element measured by the external measurement device. The second ratio may be preset based on a third measured luminance of the plurality of first internal area pixels measured by the external measurement device and a fourth measured luminance of the second light-emitting element measured by the external measurement device.

According to an embodiment of the disclosure, the first ratio may be preset in proportion to a difference between the first measured luminance and the second measured luminance. The second ratio may be preset in proportion to a difference between the third measured luminance and the fourth measured luminance.

According to an embodiment of the disclosure, the plurality of light-emitting elements may include a third light-emitting element disposed at a third location that is further from the boundary line than the second location and configured to output light of a third color. The controller may be configured to increase a luminance of the third light-emitting element to be higher than a reference luminance of the third light-emitting element determined based on the image data, and reduce the luminance of the first light-emitting element to be lower than the reference luminance of the first light-emitting element by a first ratio, increase the luminance of the second light-emitting element to be higher than the reference luminance of the second light-emitting element by a second ratio, and increase the luminance of the third light-emitting element to be higher than the reference luminance of the third light-emitting element by a third ratio. The third ratio may be greater than the second ratio.

According to an embodiment of the disclosure, the plurality of light-emitting elements may include a third light-emitting element disposed at a third location that is closer to the boundary line than the second location and further from the boundary line than the first location and configured to output light of a third color. The controller may be configured to increase a luminance of the third light-emitting element to be higher than a reference luminance of the third light-emitting element determined based on the image data, and reduce the luminance of the first light-emitting element to be lower than the reference luminance of the first light-emitting element by a first ratio, increase the luminance of the second light-emitting element to be higher than the reference luminance of the second light-emitting element by a second ratio, and increase the luminance of the third light-emitting element to be higher than the reference luminance of the third light-emitting element by a third ratio. The second ratio may be greater than the third ratio.

According to an embodiment of the disclosure, the second display module may have a same configuration as the first display module. The second display module may have an orientation, relative to the first display module, that is rotated 180 degrees about a front to back axis through a center of the second display module, so as to be arranged end to end with the first display module.

According to an embodiment of the disclosure, the first light-emitting element may be a blue light-emitting element. The second light-emitting element may be a green light-emitting element or a red light-emitting element.

According to an embodiment of the disclosure, provided is a method of controlling a display apparatus including a first display module including a plurality of first pixels, a second display module including a plurality of second pixels, and arranged adjacent to the first display module with a boundary line between the first display module and the second display module, wherein the plurality of first pixels includes a plurality of first boundary pixels adjacent to the boundary line, the plurality of second pixels includes a plurality of second boundary pixels adjacent to the boundary line, and wherein each first boundary pixel of the plurality of first boundary pixels and each second boundary pixel of the plurality of second boundary pixels includes a plurality of light-emitting elements including a first light-emitting element disposed at a first location closest to the boundary line and configured to output light of a first color, and a second light-emitting element disposed at a second location that is further from the boundary line than the first location and configured to output light of a second color, the method including controlling the plurality of first pixels and the plurality of second pixels based on image data, including reducing a luminance of the first light-emitting element to be lower than a reference luminance of the first light-emitting element determined based on the image data, and increasing a luminance of the second light-emitting element to be higher than a reference luminance of the second light-emitting element determined based on the image data.

According to an embodiment of the disclosure, the plurality of first boundary pixels may form a first boundary area. The plurality of first pixels may include a plurality of first internal area pixels disposed in a first internal area adjacent to the first boundary area. The plurality of second boundary pixels may form a second boundary area. The plurality of second pixels may include a plurality of second internal area pixels disposed in a second internal area adjacent to the second boundary area.

According to an embodiment of the disclosure, the first display module may include a first bezel area adjacent to the first internal area, and a first driver integrated circuit (IC) disposed in the first bezel area. The second display module may include a second bezel area adjacent to the second internal area, and a second driver IC disposed in the second bezel area.

According to an embodiment of the disclosure, the plurality of first boundary pixels and the plurality of first internal area pixels may be arranged in a vertical direction with the plurality of first boundary pixels between the boundary line and the plurality of first internal area pixels. The plurality of second boundary pixels and the plurality of second internal area pixels may be arranged in a vertical direction with the plurality of second boundary pixels between the boundary line and the plurality of second internal area pixels.

According to an embodiment of the disclosure, the reducing of the luminance of the first light-emitting element to be lower than the reference luminance of the first light-emitting element and the increasing of the luminance of the second light-emitting element to be higher than the reference luminance of the second light-emitting element may include reducing the luminance of the first light-emitting element to be lower than the reference luminance of the first light-emitting element by a first ratio, and increasing the luminance of the second light-emitting element to be higher than the reference luminance of the second light-emitting element by a second ratio. The first ratio may be preset based on a first measured luminance of the plurality of first internal area pixels measured by an external measurement device and a second measured luminance of the first light-emitting element measured by the external measurement device. The second ratio may be preset based on a third measured luminance of the plurality of first internal area pixels measured by the external measurement device and a fourth measured luminance of the second light-emitting element measured by the external measurement device.

Advantageous Effects

According to the disclosure, by compensating for a luminance of each of a plurality of light-emitting elements included in pixels adjacent to a boundary line between display modules, the boundary line between the display modules may be prevented from being visible.

DESCRIPTION OF DRAWINGS

These and/or other aspects of the disclosure will become apparent and more readily appreciated from the following description of embodiments, taken in conjunction with the accompanying drawings listed below.

FIG. 9 is a diagram illustrating an example of a seam line formed near a boundary line in a case where a luminance of boundary pixels adjacent to the boundary line is not compensated for.

MODES OF THE DISCLOSURE

Figure 1:
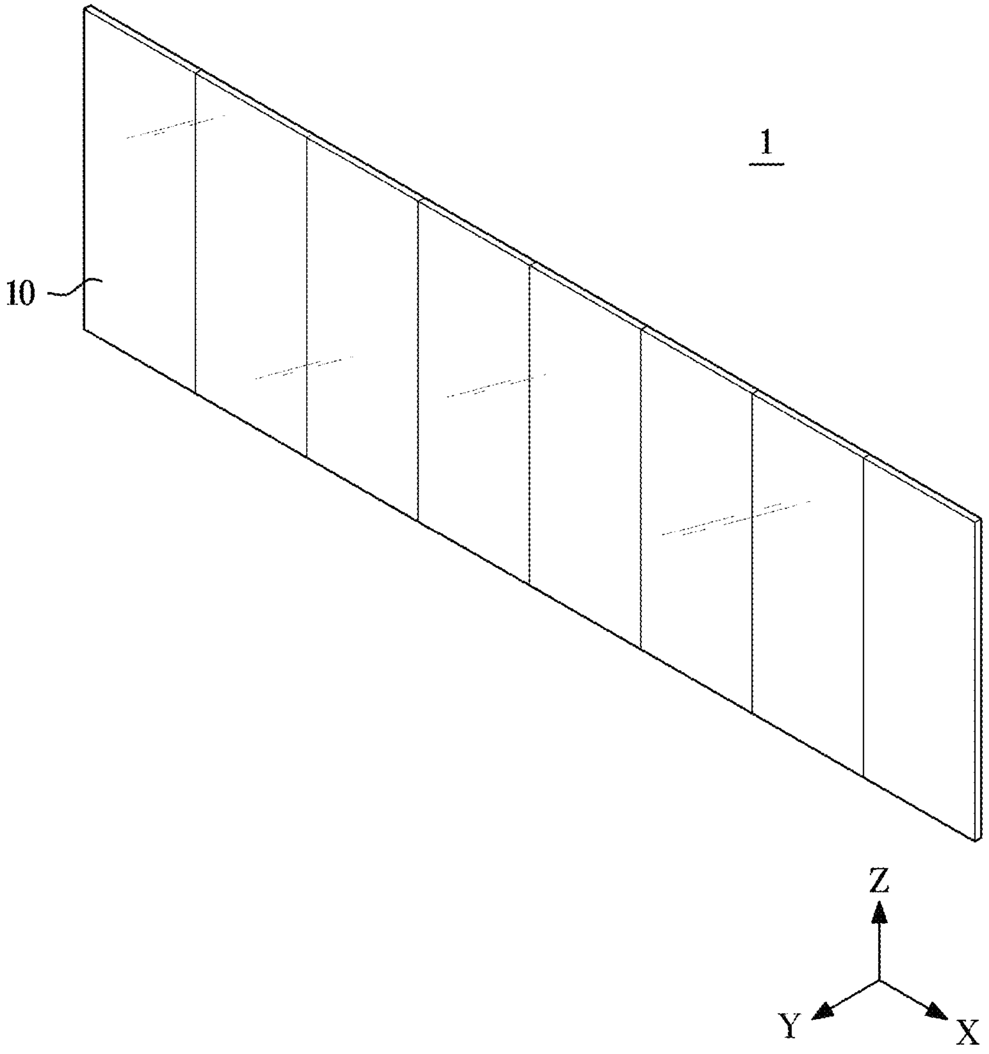
FIG. 1, FIG. 2, and FIG. 3 are perspective views illustrating an example of a display module and a display apparatus including the display module according to an embodiment of the disclosure.

Various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless otherwise indicated herein or clearly contradicted by context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (e.g., importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

Meanwhile, the terms "front", "rear", "left", "right", "upper", and "lower" used in the following description are defined based on the drawings, and the shape and location of each component are not limited by these terms. For example, the front side may be defined as the +X side and the rear side may be defined as the −X side. For example, based on the drawings, the right side may be defined as the +Y side and the left side may be defined as the −Y side. For example, based on the drawings, the upper side may be defined as the +Z side and the lower side may be defined as the −Z side.

Hereinafter, various embodiments of the disclosure will be described in detail with reference to the accompanying drawings.

Figure 2:
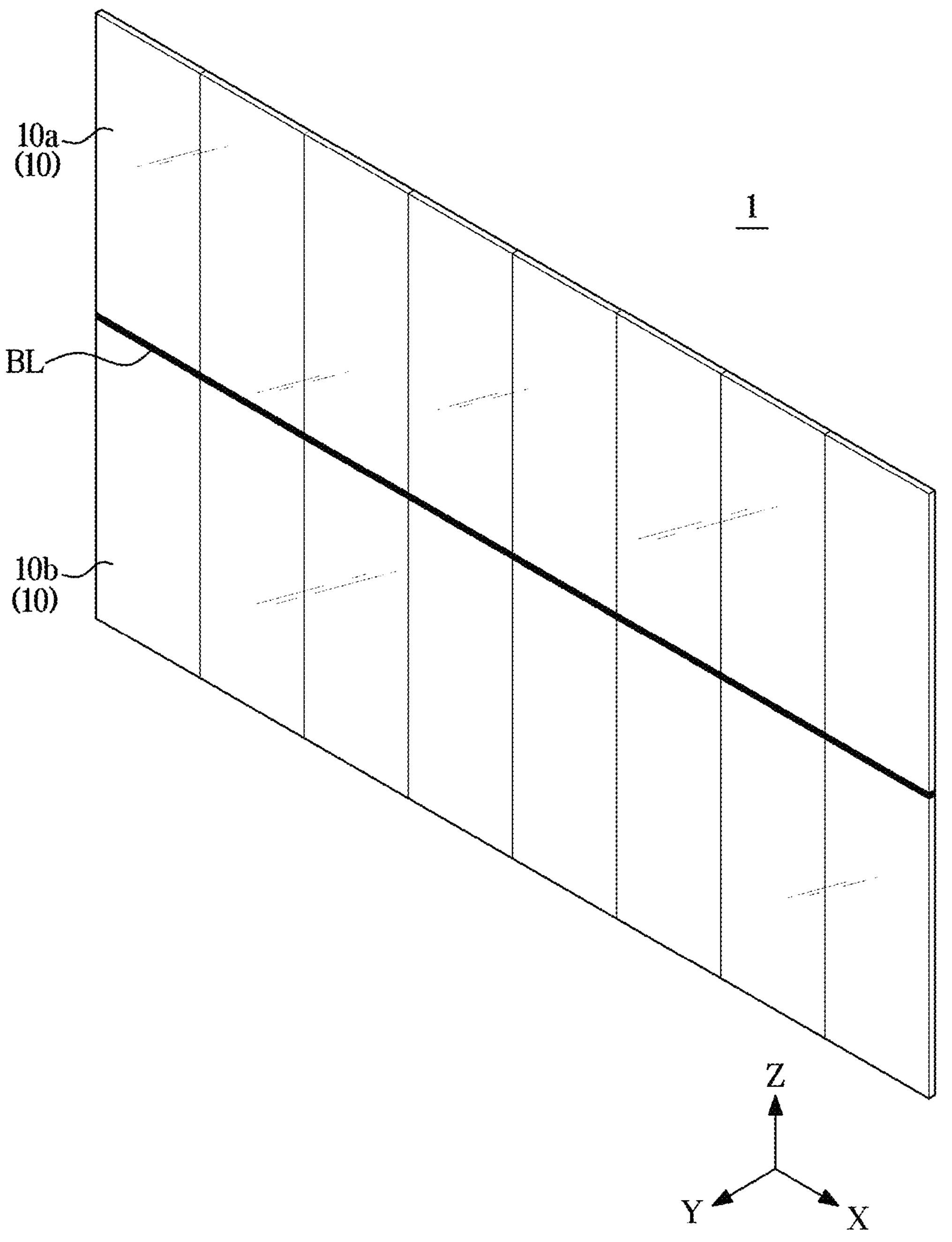
Figure 3:
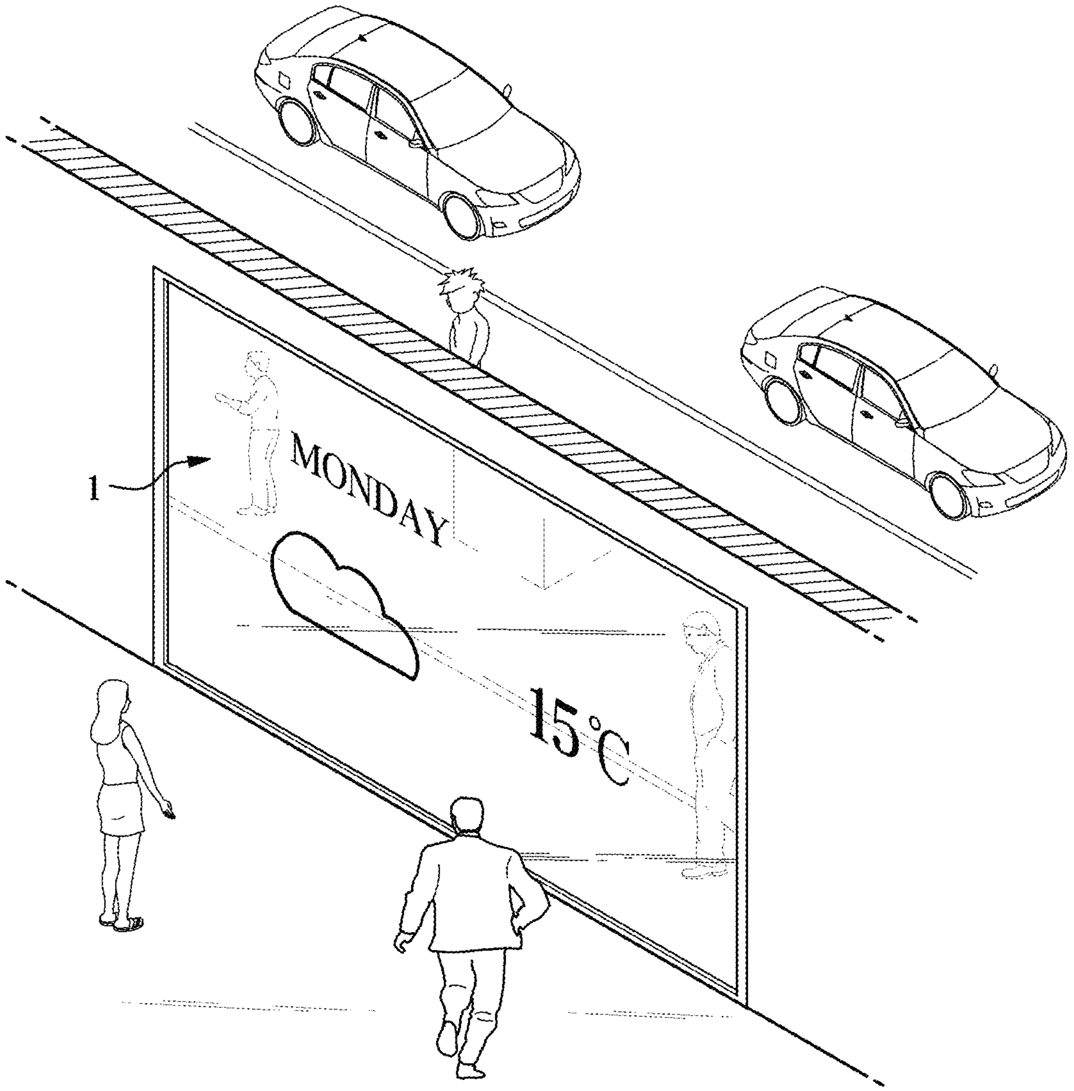

FIG. 1, FIG. 2, and FIG. 3 are perspective views illustrating an example of a display module and a display apparatus including the display module according to an embodiment.

Referring to FIG. 1 and FIG. 2, a three-dimensional coordinate system of XYZ axes of FIG. 1 and FIG. 2 is based on a display apparatus 1, and a plane where a screen of the display apparatus 1 is located is a XZ plane, and a direction in which an image is output is +Y direction.

As shown in FIG. 1 and FIG. 2, in a case where the display apparatus 1 is in an upright state, a −X to +X direction may be referred to as a left-right direction, a −Z to +Z direction may be referred to as an up-down direction, and a +Y direction in which the image is output may be referred to as a front, and the opposite direction may be referred to as a rear.

The display apparatus 1 according to an embodiment is a self-luminous display apparatus having pixels each including a light-emitting element arranged therein to emit light by itself. Accordingly, unlike a liquid crystal display apparatus, the display apparatus does not require components such as a backlight unit, a liquid crystal layer, etc., thereby implementing thinness, having a simple structure, and allowing various changes in design.

In addition, the display apparatus 1 according to an embodiment may employ an inorganic light-emitting element such as an inorganic light-emitting diode (LED) for the light-emitting element arranged in each pixel. The inorganic light-emitting element has quick response speed compared to an organic light-emitting element such as an organic LED (OLED) and may implement high luminance at low electric power.

Furthermore, unlike the organic light-emitting element that is vulnerable to exposure to water and oxygen, requires an encapsulation process, and has weak durability, the inorganic light-emitting element has strong durability without a need for the encapsulation process. Hereinafter, the inorganic light-emitting element to be described in the following embodiment refers to the inorganic LED.

The light-emitting element employed in the display apparatus 1 according to an embodiment may be a micro LED, a short side of which has a size of approximately 100 μm, a few tens of μm or a few μm. By employing the micro-sized LEDs, pixel size may be reduced and high resolution may be implemented within the same size screen.

The display apparatus employing the micro LED may be applied in various fields by using the subminiature pixel size and great thinness. For example, as shown in FIG. 1 and FIG. 2, a large screen may be implemented by tiling a plurality of display modules 10 onto which a plurality of micro LEDs are transferred, and the large screen display apparatus may be used as a signage, a billboard, and the like.

In addition, the display apparatus 1 according to an embodiment may implement various screen sizes by tiling the plurality of display modules 10 in various numbers or arrangements.

For example, as shown in FIG. 1, the display apparatus 1 may include the plurality of display modules 10 tiled in the left-right direction (−X to +X direction).

In another example, as shown in FIG. 2, the display apparatus 1 may include a plurality of first display modules 10*a* and a plurality of second display modules 10*b* tiled in the left-right direction (−X to +X direction) and the up-down direction (−Z to +Z direction).

Specifically, the display apparatus 1 may include the plurality of first display modules 10*a* tiled in the left-right direction (−X to +X direction), and the plurality of second display modules 10*b* tiled in the left-right direction (−X to +X direction), wherein each of the plurality of second display modules 10*b* is tiled in the up-down direction (−Z to +Z direction) for each of the plurality of first display modules 10*a*.

As shown in FIG. 2, in a case where the plurality of second display modules 10*b* are tiled in the up-down direction (−Z to +Z direction) for each of the plurality of first display modules 10*a*, a boundary line BL may be formed between the plurality of first display modules 10*a* and the plurality of second display modules 10*b*. In order to provide an image to a user, the boundary line BL is required to be prevented from being visible, which will be described in detail later.

The display apparatus 1 according to the disclosure is not limited to those shown in FIG. 1 and FIG. 2, and may form a screen in which an image is displayed in various sizes by tiling the plurality of display modules 10.

For example, in a case where the plurality of display modules 10 are tiled only in the left-right direction (−X to +X direction), unlike that shown in FIG. 1, the display apparatus 1 according to an embodiment may include eight or less display modules 10 tiled only in the left-right direction (−X to +X direction), and may also include eight or more display modules 10 tiled only in the left-right direction (−X to +X direction).

In another example, in a case where the plurality of first display modules 10*a* and the plurality of second display modules 10*b* are tiled in the left-right direction (−X to +X direction) and the up-down direction (−Z to +Z direction), unlike that shown in FIG. 2, the number of the plurality of first display modules 10*a* and the number of the plurality of second display modules 10*b* of the display apparatus 1 according to an embodiment may be less than eight or more than eight.

Hereinafter, for convenience of description, the display apparatus 1 according to an embodiment is described as including the plurality of first display modules 10*a* and the plurality of second display modules 10*b* tiled in the left-right direction (−X to +X direction) and the up-down direction (−Z to +Z direction).

Figure 5:
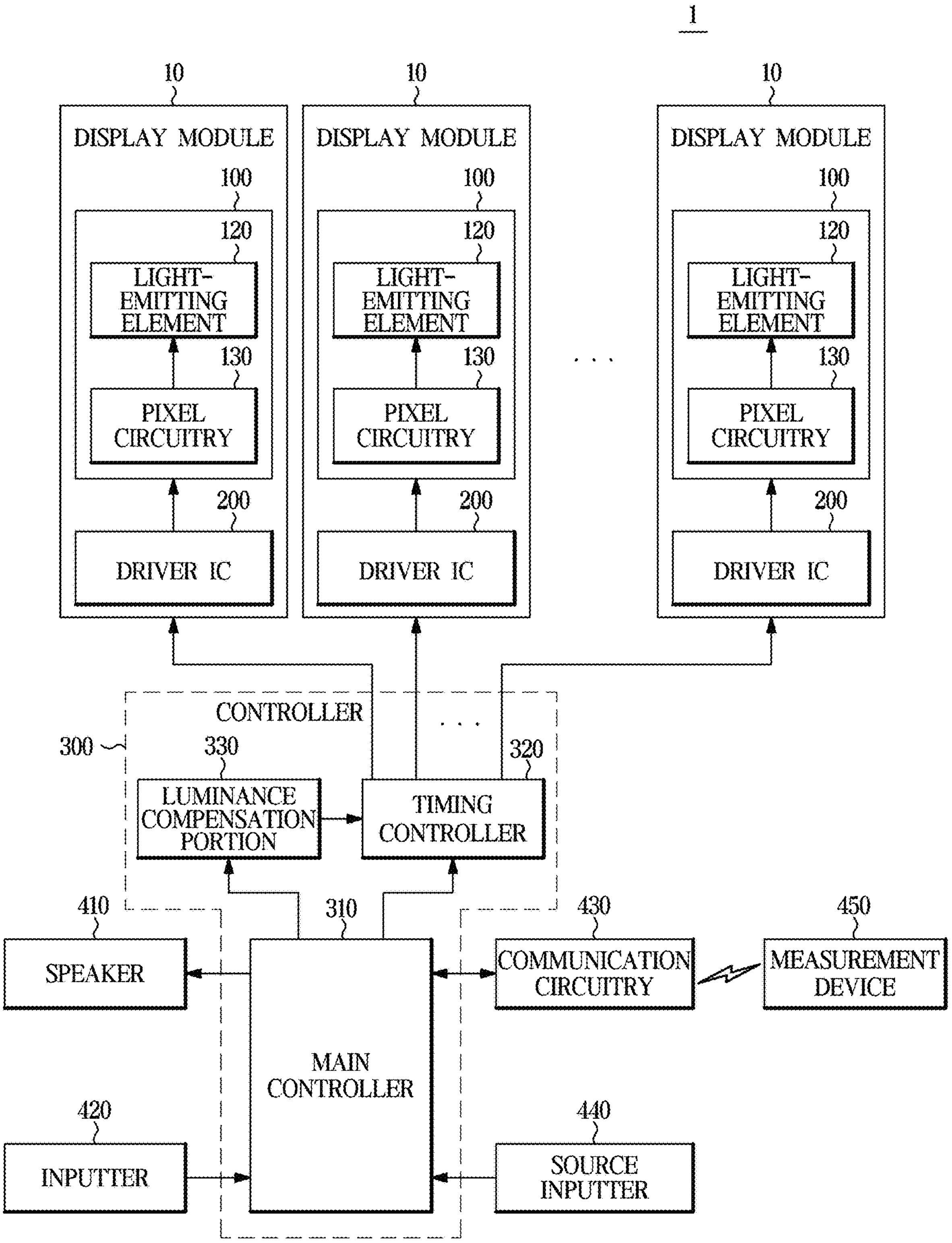
FIG. 5 is a control block diagram specifically illustrating a configuration of a display module included in a display apparatus according to an embodiment of the disclosure.

The plurality of first display modules 10*a* and the plurality of second display modules 10*b* may each include a plurality of pixels, and each of the plurality of pixels may include a light-emitting element 120 (see FIG. 5).

Figure 8:
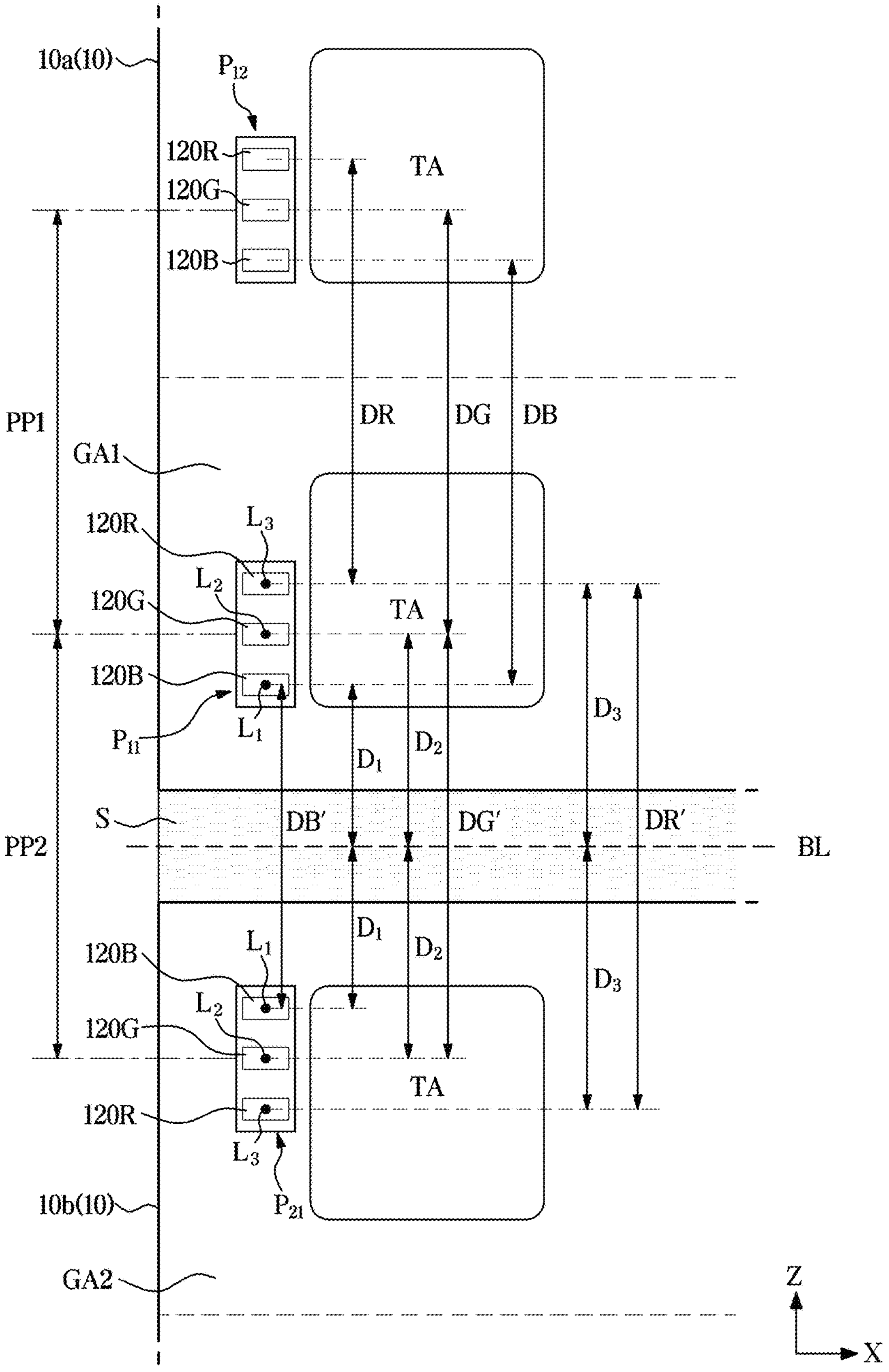
FIG. 8 is an enlarged view illustrating an example of arrangement of pixels in a display apparatus according to an embodiment of the disclosure.

The light-emitting element 120 may include a red light-emitting element 120R (see FIG. 8), a green light-emitting element 120G (see FIG. 8), and/or a blue light-emitting element 120B (see FIG. 8).

Referring to FIG. 3, the display apparatus 1 according to an embodiment may be implemented as a transparent display apparatus. In the transparent display apparatus, by arranging circuit elements for image implementation on a transparent substrate, a user may view not only the image displayed on the transparent display apparatus, but also objects beyond the image.

The display apparatus 1 according to an embodiment does not require a backlight unit, a liquid crystal layer, or an encapsulation layer, and only requires an ultra-small micro LED and driving circuitry and wiring for driving the micro LED, and thus an aperture ratio, which is crucial in implementing the transparent display apparatus, may be easily secured.

In the embodiments described below, it is assumed that the display apparatus 1 is implemented as a transparent display apparatus.

Figure 4:
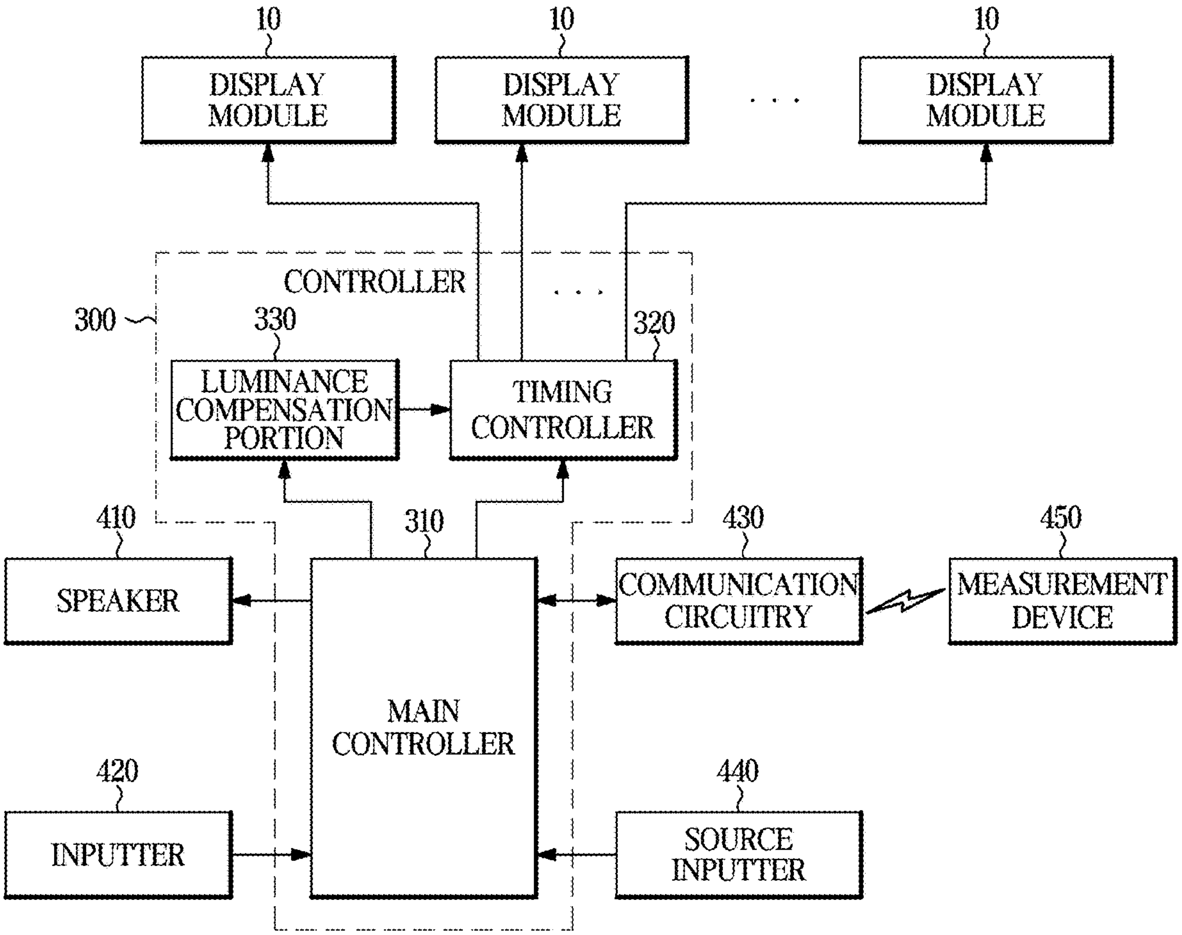
FIG. 4 is a control block diagram of a display apparatus according to an embodiment of the disclosure.

FIG. 4 is a control block diagram of a display apparatus according to an embodiment.

FIG. 5 is a control block diagram specifically illustrating a configuration of a display module included in a display apparatus according to an embodiment.

Referring to FIG. 4 and FIG. 5, the display apparatus 1 according to an embodiment may include the plurality of display modules 10, a controller 300 for controlling the plurality of display modules 10, a communication circuitry 430 communicating with an external measurement device 450, a source inputter 440 receiving a source image, a speaker 410 outputting sound, and an inputter 420 receiving a command to control the display apparatus 1 from a user.

The inputter 420 may include a button or a touch pad arranged in a region of the display apparatus 1, and in a case where a display panel 100 is implemented as a touch screen, the inputter 420 may include a touch pad provided on the front of the display panel 100. In addition, the inputter 420 may also include a remote controller.

The inputter 420 may receive various commands from the user to control the display apparatus 1, such as power on/off, volume control, channel tuning, screen adjustment, various settings change, and the like.

The speaker 410 may output sound based on a sound signal processed by a main controller 310 from a source signal received by the source inputter 440.

The communication circuitry 430 may communicate with a relay server or another electronic device to exchange data required. The communication circuitry 430 may employ at least one of various wireless communication methods such as third generation (3G), fourth generation (4G), wireless local area network (WLAN), wireless fidelity (Wi-Fi), Bluetooth, Zigbee, Wi-Fi direct (WFD), ultra-wideband (UWB), infrared data association (IrDA), Bluetooth low energy (BLE), near field communication (NFC), Z-wave, and the like. In addition, a wired communication method such as peripheral component interconnect (PCI), PCI-express, universal serial bus (USB), and the like, may be employed.

The communication circuitry 430 may receive various data from the external measurement device 450. For example, the communication circuitry 430 may receive data about a measured luminance.

The measured luminance may include a measured luminance of pixel measured by the external measurement device 450. For example, the measured luminance may include a measured luminance of each of the plurality of pixels measured by the external measurement device 450.

In addition, the measured luminance may include a measured luminance of light-emitting element 120 measured by the external measurement device 450. For example, the measured luminance may include a measured luminance of each of the plurality of light-emitting elements 120 measured by the external measurement device 450.

That is, the measured luminance may include the measured luminance of each pixel of the display module 10 measured by the external measurement device 450, and the measured luminance of each light-emitting element 120 of the display module 10 measured by the external measurement device 450.

The communication circuitry 430 may transmit data about the measured luminance to the main controller 310. The main controller 310 may transmit the data about the measured luminance to a luminance compensation portion 330.

The luminance compensation portion 330 may obtain information about the measured luminance based on the data about the measured luminance. For example, the luminance compensation portion 330 may obtain the measured luminance of each of the plurality of pixels based on the data about the measured luminance.

The luminance compensation portion 330 may also obtain the measured luminance of each of the plurality of light-emitting elements 120 based on the data about the measured luminance.

In addition, the luminance compensation portion 330 may include a memory (not shown) that may store information about the measured luminance. For example, the luminance compensation portion 330 may store the measured luminance of each of the plurality of pixels and the measured luminance of each of the plurality of light-emitting elements 120.

The source inputter 440 may receive a source signal input from a set-top box, USB, antenna, and the like. Accordingly, the source inputter 440 may include at least one selected from a group of source input interfaces including a high definition multimedia interface (HDMI) cable port, a USB port, an antenna, and the like.

The source signal received by the source inputter 440 may be processed by the main controller 310 and converted into a form that may be output from the display panel 100 and the speaker 410.

The controller 300 may include the main controller 310 processing the source signal input through the source inputter 440 to generate image data corresponding to the input source signal, a timing controller 320 processing the image data transmitted from the main controller 310 and transmitting the processed data to each of the plurality of display modules 10, and/or the luminance compensation portion 330.

The main controller 310 may generate image data of a desired image quality by image quality correction using the source signal input through the source inputter 440.

The main controller 310 may separate the generated image data into image data corresponding to each of the plurality of display modules 10, and transmit the data to the timing controller 320. For example, the main controller 310 may generate image data corresponding to a source signal, separate the image data into image data corresponding to each of the plurality of display modules 10, and transmit each of the separated image data to the timing controller 320 through a plurality of cables. The plurality of cables may include a Digital Visual Interface (DVI) cable, Low Voltage Differential Signals (LVDS) cable, a High Definition Multimedia Interface (HDMI) cable, and/or an optical cable.

The timing controller 320 may process the image data received from the main controller 310 to obtain pixel data.

In addition, the main controller 310 may process the image data to obtain pixel data, and transmit the obtained pixel data to the timing controller 320.

The pixel data may include R color data, G color data, and/or B color data having gray levels according to a grayscale.

In a case where there are 256 levels of grayscale, each of the R color data, G color data, and B color data may have a gray level ranging from 0 to 255. In this case, a luminance of each light-emitting element 120 may be adjusted across 256 distinct levels.

For example, in a case where the light-emitting element 120 is the red light-emitting element 120R (see FIG. 8), the R color data may have a single gray level from 0 to 255, and thus a luminance of the red light-emitting element 120R (see FIG. 8) may be adjusted across 256 distinct levels.

In another example, in a case where the light-emitting element 120 is the green light-emitting element 120G (see FIG. 8), the G color data may have a single gray level from 0 to 255, and thus a luminance of the green light-emitting element 120G (see FIG. 8) may be adjusted across 256 distinct levels.

In still another example, in a case where the light-emitting element 120 is the blue light-emitting element 120B (see FIG. 8), the B color data may have a single gray level from 0 to 255, and thus a luminance of the blue light-emitting element 120B (see FIG. 8) may be adjusted across 256 distinct levels.

The pixel data according to the disclosure may include data having gray levels in different grayscales, in addition to 256 levels of grayscale. For example, in a case where pixel data is implemented in 4 bits, there are 16 levels of grayscale, and pixel data may have a gray level from 0 to 15, and thus a luminance of the light-emitting element 120 may be adjusted across 16 distinct levels.

The larger the grayscale, the higher the grayscale level of the light-emitting element 120 corresponding to the pixel data.

The luminance compensation portion 330 may compensate for the pixel data transmitted from the timing controller 320 to each of the plurality of display modules 10.

For example, the luminance compensation portion 330 may compensate for the R color data transmitted from the timing controller 320 to each of the plurality of display modules 10 to change a gray level of the R color data.

In another example, the luminance compensation portion 330 may compensate for the G color data transmitted from the timing controller 320 to each of the plurality of display modules 10 to change a gray level of the G color data.

In still another example, the luminance compensation portion 330 may compensate for the B color data transmitted from the timing controller 320 to each of the plurality of display modules 10 to change a gray level of the B color data.

Each of the plurality of display modules 10 may include the display panel 100 that displays an image and a driver Integrated Circuit (IC) 200 that drives the display panel 100. Each of the plurality of display modules 10 may be a transparent display module for implementing a transparent display apparatus.

The driver IC 200 may generate a driving signal for the display panel 100 to display an image based on the pixel data transmitted from the timing controller 320.

The driving signal generated from the driver IC 200 may include a gate signal and a data signal, and the generated driving signal may be input to the display panel 100.

The display panel 100 may include pixel circuitry 130 and the plurality of light-emitting elements 120. The plurality of light-emitting elements 120 may include the red light-emitting element 120R (see FIG. 8), the green light-emitting element 120G (see FIG. 8), and/or the blue light-emitting element 120B (see FIG. 8).

Each of the plurality of light-emitting elements 120 may be individually controlled by the pixel circuitry 130, and each pixel circuitry 130 may operate based on the driving signal output from the driver IC 200.

Figure 6:
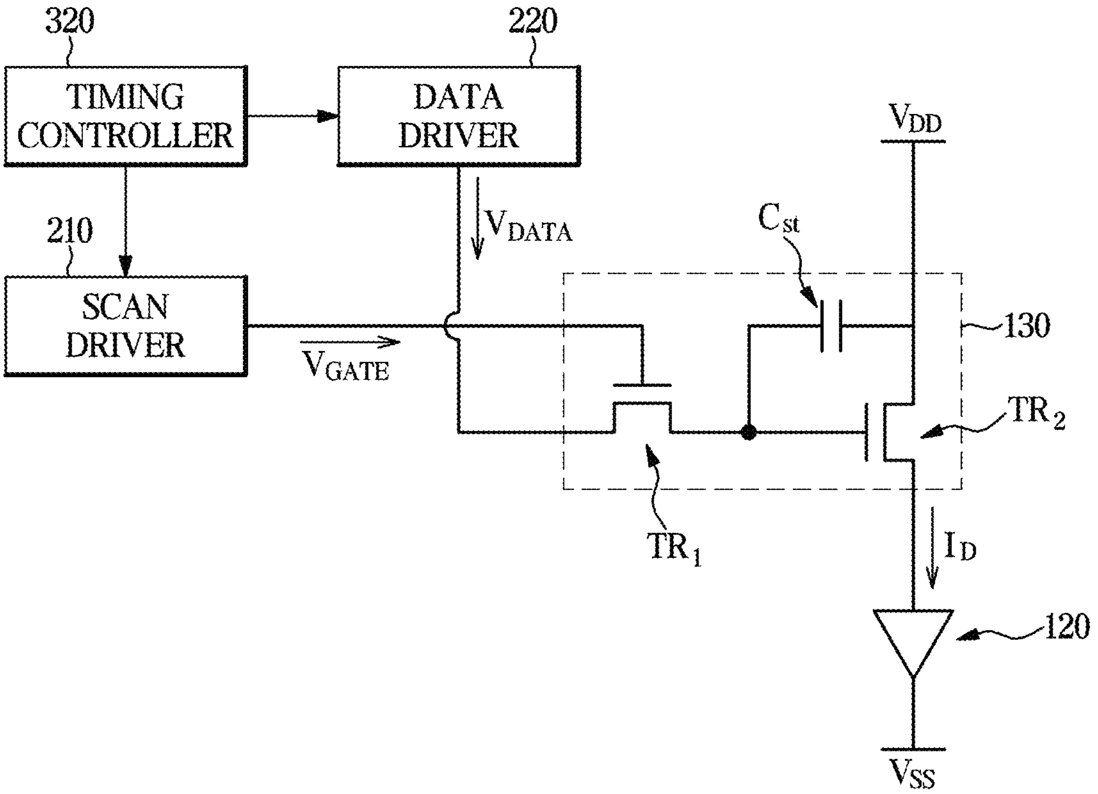
FIG. 6 is a diagram for conceptually illustrating how each pixel is driven in a display module according to an embodiment of the disclosure.

FIG. 6 is a diagram for conceptually illustrating how each pixel is driven in a display module according to an embodiment.

Referring to FIG. 6, the driver IC 200 may include a scan driver 210 and a data driver 220. The scan driver 210 may output a gate signal for turning on/off the light-emitting element 120, and the data driver 220 may output a data signal for realizing (displaying) an image.

The data driver 220 may generate the data signal based on pixel data transmitted from the timing controller 320.

The gate signal output from the scan driver 210 and the data signal output from the data driver 220 may be input to the pixel circuitry 130.

For example, once a gate voltage $V_{GATE}$, a data voltage $V_{DATA}$, and a power voltage $V_{DD}$ are input to the pixel circuitry 130, the pixel circuitry 130 may output a driving current $I_D$ to drive the light-emitting element 120.

The driving current $I_D$ output from the pixel circuitry 130 may be input to the light-emitting element 120, and the light-emitting element 120 may emit light based on the input driving current $I_D$ to realize an image.

The driving current $I_D$ output from the pixel circuitry 130 may be determined based on pixel data. For example, in a case where the light-emitting element 120 is the red light-emitting element 120R (see FIG. 8), the data driver 220 may generate the data voltage $V_{DATA}$ applied to the pixel circuitry 130 based on the R color data received from the timing controller 320, and the generated data voltage $V_{DATA}$ may be applied to the pixel circuitry 130 connected to the red light-emitting element 120R (see FIG. 8). Accordingly, the driving current $I_D$ may be output from the pixel circuitry 130.

The pixel circuitry 130 may include transistors $TR_1$ and $TR_2$ that switch or drive the light-emitting element 120 and a capacitor $C_{st}$. As described above, the light-emitting element 120 may be a micro LED.

For example, the transistors $TR_1$ and $TR_2$ may include the switching transistor $TR_1$ and the driving transistor $TR_2$, and the switching transistor $TR_1$ and the driving transistor $TR_2$ may be implemented as at least one of a Positive Channel Metal-Oxide Semiconductor (PMOS) transistor, Negative Channel Metal-Oxide Semiconductor (NMOS) transistor, or Complementary Metal-Oxide Semiconductor (CMOS) transistor.

In addition, the transistors $TR_1$ and $TR_2$ may be Thin Film Transistors (TFTs). For example, the transistors $TR_1$ and $TR_2$ may be implemented as at least one of an a-Si TFT, Low-Temperature Poly Silicon (LTPS) TFT, or oxide TFT.

Of the switching transistor $TR_1$, a gate electrode is connected to the scan driver 210, a source electrode is connected to the data driver 220, and a drain electrode is connected to an end of the capacitor $C_{st}$ and a gate electrode of the driving transistor $TR_2$. The power voltage $V_{DD}$ may be applied through the other end of the capacitor $C_{st}$.

In addition, of the driving transistor $TR_2$, the power voltage $V_{DD}$ is applied to a source electrode, and a drain electrode is connected to an anode of the light-emitting element 120. A cathode of the light-emitting element 120 may be connected to a reference voltage $V_{SS}$. The reference voltage $V_{SS}$ has a lower level than the power voltage $V_{DD}$, for which a ground voltage is used to serve earthing.

The pixel circuitry 130 of the above-described structure may operate as follows. First, when the gate voltage $V_{GATE}$ is applied from the scan driver 210 to turn on the switching transistor $TR_1$, the data voltage $V_{DATA}$ applied from the data driver 220 may be transmitted to one end of the capacitor $C_{st}$ and the gate electrode of the driving transistor $TR_2$.

A voltage corresponding to a gate-source voltage $V_{GS}$ of the driving transistor $TR_2$ may be maintained by the capacitor $C_{st}$ for a preset period of time. The driving transistor $TR_2$ may cause the light-emitting element 120 to emit light by applying the driving current $I_D$ corresponding to the gate-source voltage $V_{GS}$ to the anode of the light-emitting element 120.

Figure 7:
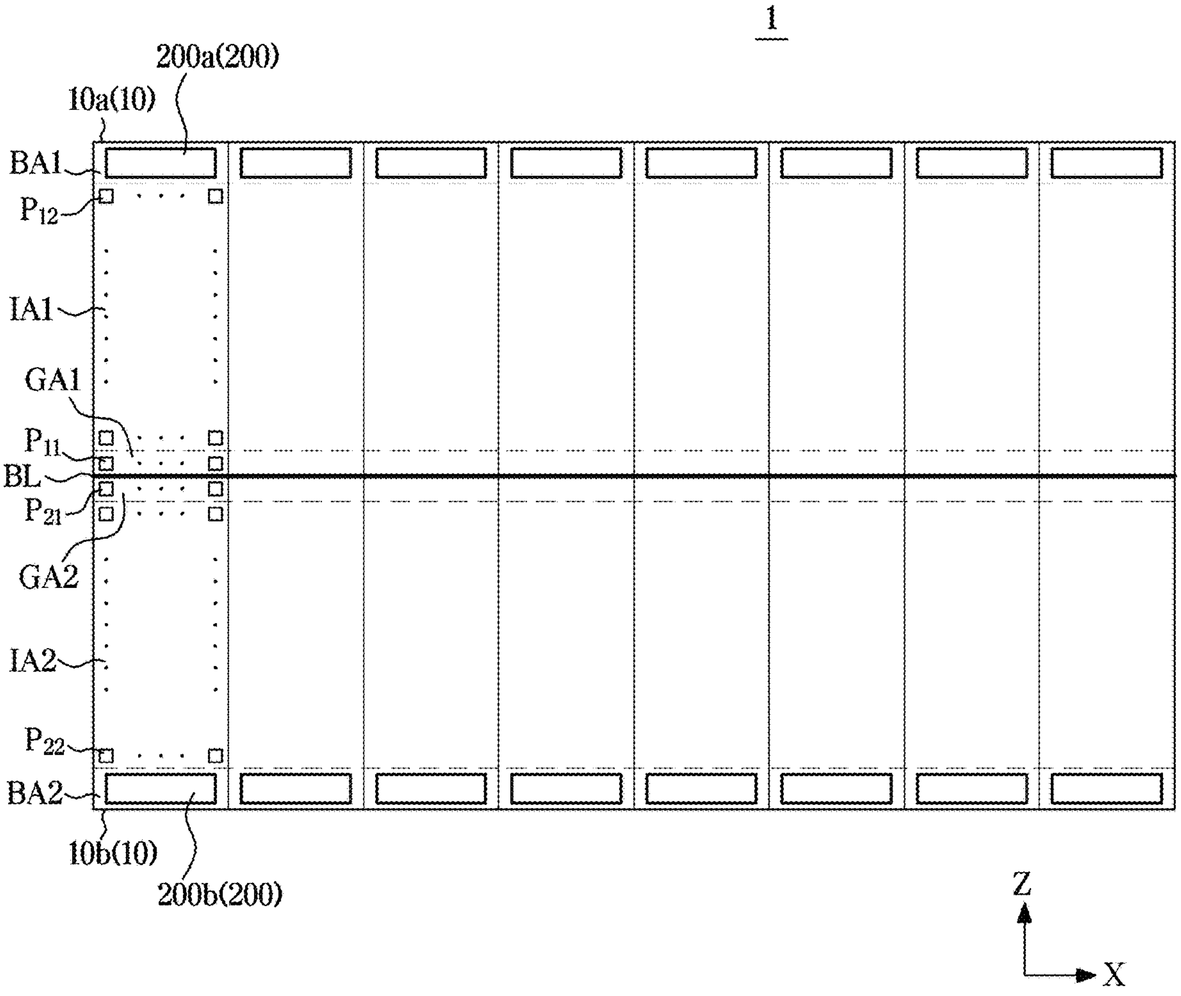
FIG. 7 is a front view of a display apparatus illustrating an example of arrangement of pixels in the display apparatus according to an embodiment of the disclosure.

FIG. 7 is a front view of a display apparatus illustrating an example of arrangement of pixels in the display apparatus according to an embodiment.

Referring to FIG. 7, as described above, the display apparatus 1 may include the plurality of first display modules 10*a* and the plurality of second display modules 10*b*.

The first display modules 10*a* and the second display modules 10*b* may be arranged adjacent to each other with respect to a boundary line BL.

The first display module 10*a* may be the same display module as the second display module 10*b*.

The display apparatus 1 may include the first display module 10*a*, and the second display module 10*b*, which is the first display module 10*a* rotated 180 degrees.

That is, the second display module 10*b* may be formed by rotating the first display module 10*a* by 180 degrees based on the first display module 10*a*, and the second display module 10*b* and the first display module 10*a* are symmetrically arranged with respect to the boundary line BL.

Each of the plurality of first display modules 10*a* may include a plurality of first pixels. The plurality of first pixels may include first boundary pixels P11.

The first boundary pixels P11 may be arranged adjacent to the boundary line BL. For example, the first boundary pixels P11 may be arranged in a first boundary area GA1 adjacent to the boundary line BL. The first boundary pixels P11 may be arranged in the left-right direction (−X to +X direction) in the first boundary area GA1 and may be arranged in one column.

The plurality of first pixels may include first internal area pixels P12 arranged in a first internal area IA1 adjacent to the first boundary area GA1.

The first internal area pixels P12 may be arranged in a two-dimensional array in the first internal area IA1. For example, the first internal area pixels P12 may be arranged in an M×N matrix in the first internal area IA1. However, the arrangement of the first internal area pixels P12 is not limited thereto and may be arranged at various locations in the first internal area IA1.

The first boundary pixels P11 and the first internal area pixels P12 may be arranged in a vertical direction (−Z to +Z direction) based on the boundary line BL. For example, each of the first boundary pixels P11 may be arranged in one row with the first internal area pixels P12. The vertical direction (−Z to +Z direction) based on the boundary line BL may refer to the same direction as the up-down direction (−Z to +Z direction) described in FIG. 1 and FIG. 2.

Each of the plurality of first display modules 10*a* may include a first driver IC 200*a* disposed in a first bezel area BA1 adjacent to the first internal area IA1.

The first driver IC 200*a* may output a gate signal for turning on/off the light-emitting element 120 included in each of the plurality of first pixels, and may output a data signal based on pixel data received from the timing controller 320.

The first driver IC 200*a* may perform functions of both the scan driver 210 (see FIG. 6) and the data driver 220 (see FIG. 6).

The gate signal and the data signal output from the first driver IC 200*a* may be transmitted to each of the plurality of pixel circuitry 130, and the light-emitting element 120 connected to each of the pixel circuitry 130 may emit light by the driving current output from the pixel circuitry 130.

The first bezel area BA1 may be formed on only one side of the first display module 10*a*. That is, among the four sides of the first display module 10*a*, a bezel area where an image is not output may be formed on only one side.

As a result, an active area where the image may be output may be formed on the remaining three sides of the first display module 10*a*, and thus a three-sided bezel-less image may be achieved.

Each of the plurality of second display modules 10*b* may include a plurality of second pixels. The plurality of second pixels may include second boundary pixels P21.

The second boundary pixels P21 may be arranged adjacent to the boundary line BL. For example, the second boundary pixels P21 may be arranged in a second boundary area GA2 adjacent to the boundary line BL. The second boundary pixels P21 may be arranged in the left-right direction (−X to +X direction) in the second boundary area GA2, and may be arranged in one column.

The plurality of second pixels may include second internal area pixels P22 arranged in a second internal area IA2 adjacent to the second boundary area GA2.

The second internal area pixels P22 may be arranged in a two-dimensional array in the second internal area IA2. For example, the second internal area pixels P22 may be arranged in an M×N matrix in the second internal area IA2. However, the arrangement of the second internal area pixels P22 is not limited thereto and may be arranged at various locations in the second internal area IA2.

The second boundary pixels P21 and the second internal area pixels P22 may be arranged in a vertical direction (−Z to +Z direction) based on the boundary line BL. For example, each of the second boundary pixels P21 may be arranged in one row with the second internal area pixels P22.

Each of the plurality of second display modules 10*b* may include a second driver IC 200*b* disposed in a second bezel area BA2 adjacent to the second internal area IA2.

The second driver IC 200*b* may output a gate signal for turning on/off the light-emitting element 120 included in each of the plurality of second pixels, and may output a data signal based on pixel data received from the timing controller 320.

The second driver IC 200*b* may perform functions of both the scan driver 210 (see FIG. 6) and the data driver 220 (see FIG. 6).

The gate signal and the data signal output from the second driver IC 200*b* may be transmitted to each of the plurality of pixel circuitry 130, and the light-emitting element 120 connected to each of the pixel circuitry 130 may emit light by the driving current output from the pixel circuitry 130.

The second bezel area BA2 may be formed on only one side of the second display module 10*b*. That is, among the four sides of the second display module 10*b*, a bezel area where an image is not output may be formed on only one side.

As a result, an active area where the image may be output may be formed on the remaining three sides of the second display module 10*b*, thereby achieving a three-sided bezel-less image.

FIG. 8 is an enlarged view illustrating an example of arrangement of pixels in a display apparatus according to an embodiment.

Referring to FIG. 8, each of the plurality of first pixels may include a red light-emitting element 120R, a green light-emitting element 120G, and/or a blue light-emitting element 120B.

For example, each of the first boundary pixels P11 may include a red light-emitting element 120R, a green light-emitting element 120G, and/or a blue light-emitting element 120B, and each of the first internal area pixels P12 may also include a red light-emitting element 120R, a green light-emitting element 120G, and/or a blue light-emitting element 120B.

The red light-emitting element 120R of each of the plurality of first pixels and the red light-emitting element 120R of an adjacent first pixel may be arranged at a first red sub-pixel distance DR.

For example, the red light-emitting element 120R of the first boundary pixel P11 and the red light-emitting element 120R of the first internal area pixel P12 adjacent to the first boundary pixel P11 may be arranged at the first red sub-pixel distance DR.

The green light-emitting element 120G of each of the plurality of first pixels and the green light-emitting element 120G of an adjacent first pixel may be arranged at a first green sub-pixel distance DG.

For example, the green light-emitting element 120G of the first boundary pixel P11 and the green light-emitting element 120G of the first internal area pixel P12 adjacent to the first boundary pixel P11 may be arranged at the first green sub-pixel distance DG.

The blue light-emitting element 120B of each of the plurality of first pixels and the blue light-emitting element 120B of an adjacent first pixel may be arranged at a first blue sub-pixel distance DB.

The blue light-emitting element 120B of the first boundary pixel P11 and the blue light-emitting element 120B of the first internal area pixel P12 adjacent to the first boundary pixel P11 may be arranged at the first blue sub-pixel distance DB.

The first red sub-pixel distance DR, the first green sub-pixel distance DG, and the first blue sub-pixel distance DB may be the same distance.

Each of the plurality of first pixels may be arranged at a first pixel pitch PP1 from an adjacent first pixel.

For example, the first boundary pixel P11 and the first internal area pixel P12 adjacent to the first boundary pixel P11 may be arranged at the first pixel pitch PP1. Specifically, a center of the first boundary pixel P11 and a center of the first internal area pixel P12 may be arranged at the first pixel pitch PP1.

The blue light-emitting element 120B of the first boundary pixel P11 may be positioned at a first location L1 closest to the boundary line BL. For example, the blue light-emitting element 120B of the first boundary pixel P11 may be disposed at the first location L1 whose distance to the boundary line BL is a first distance D1.

The green light-emitting element 120G of the first boundary pixel P11 may be positioned at a second location L2 whose distance to the boundary line BL is longer than the first location L1. For example, the green light-emitting element 120G of the first boundary pixel P11 may be disposed at the second location L2 whose distance to the boundary line BL is a second distance D2 whose distance to the boundary line BL is longer than the first distance D1.

The red light-emitting element 120R of the first boundary pixel P11 may be positioned at a third location L3 whose distance to the boundary line BL is longer than the second location L2. For example, the red light-emitting element 120R of the first boundary pixel P11 may be disposed at the third location L3 whose distance to the boundary line BL is a third distance D3 whose distance to the boundary line BL is longer than the second distance D2.

Each of the plurality of second pixels may include a red light-emitting element 120R, a green light-emitting element 120G, and/or a blue light-emitting element 120B. For example, each of the second boundary pixels P21 may include a red light-emitting element 120R, a green light-emitting element 120G, and/or a blue light-emitting element 120B. Each of the second internal area pixels P22 may also include a red light-emitting element 120R, a green light-emitting element 120G, and/or a blue light-emitting element 120B.

The blue light-emitting element 120B of the second boundary pixel P21 may be positioned at the first location L1 closest to the boundary line BL. For example, the blue light-emitting element 120B of the second boundary pixel P21 may be disposed at the first location L1 whose distance to the boundary line BL is the first distance D1.

The green light-emitting element 120G of the second boundary pixel P21 may be positioned at the second location L2 whose distance to the boundary line BL is longer than the first location L1. For example, the green light-emitting element 120G of the second boundary pixel P21 may be disposed at the second location L2 whose distance to the boundary line BL is the second distance D2 whose distance to the boundary line BL is longer than the first distance D1.

The red light-emitting element 120R of the second boundary pixel P21 may be positioned at the third location L3 whose distance to the boundary line BL is longer than the second location L2. For example, the red light-emitting element 120R of the second boundary pixel P21 may be disposed at the third location L3 whose distance to the boundary line BL is the third distance D3 whose distance to the boundary line BL is longer than the second distance D2.

The blue light-emitting element 120B of the first boundary pixel P11 and the blue light-emitting element 120B of the second boundary pixel P21 may be arranged at a second blue sub-pixel distance DB'.

The second blue sub-pixel distance DB' may be smaller than the first blue sub-pixel distance DB.

A seam S may be formed between the first display module 10*a* and the second display module 10*b*. According to the disclosure, the first boundary area GA1 and the second boundary area GA2 may be arranged as close as possible, and thus the display apparatus 1 in which a gap of the seam S is minimized may be provided.

The first boundary pixel P11 and the second boundary pixel P21 may be arranged at a second pixel pitch PP2. For example, a center of the first boundary pixel P11 and a center of the second boundary pixel P21 may be arranged at the second pixel pitch PP2.

The second pixel pitch PP2 may be greater than the first pixel pitch PP1. For example, because the seam S is formed between the first boundary pixel P11 and the second boundary pixel P21, the second pixel pitch PP2 may be larger than the first pixel pitch PP1 due to a gap of the seam S. However, in a case where the first boundary area GA1 and the second boundary area GA2 are arranged as close as possible to minimize the gap of the seam S, the first pixel pitch PP1 and the second pixel pitch PP2 may be the same. However, in the following description, the second pixel pitch PP2 is described as being larger than the first pixel pitch PP1.

The green light-emitting element 120G of the first boundary pixel P11 and the green light-emitting element 120G of the second boundary pixel P21 may be arranged at a second green sub-pixel distance DG'.

Because the second pixel pitch PP2 is larger than the first pixel pitch PP1, the second green sub-pixel distance DG' may be larger than the first green sub-pixel distance DG.

The red light-emitting element 120R of the first boundary pixel P11 and the red light-emitting element 120R of the second boundary pixel P21 may be arranged at a second red sub-pixel distance DR'.

The second red sub-pixel distance DR' may be larger than the first red sub-pixel distance DR.

In summary, a distance between the same light-emitting elements of adjacent pixels included in each display module may be different from a distance between the same light-emitting elements of pixels adjacent to the boundary line BL (e.g., the first boundary pixel P11 and the second boundary pixel P21). For example, the second blue sub-pixel distance DB' may be smaller than the first blue sub-pixel distance DB, the second green sub-pixel distance DG' may be larger than the first green sub-pixel distance DG, and the second red sub-pixel distance DR' may be larger than the first red sub-pixel distance DR.

The display apparatus 1 may include an aperture area TA adjacent to each of the plurality of first pixels and the plurality of second pixels. Because each of the light-emitting elements 120 may be a micro LED, a ratio of the aperture area TA (aperture ratio or transmittance) may be maximized, thereby improving the quality of an image output through the transparent display apparatus.

Figure 9:
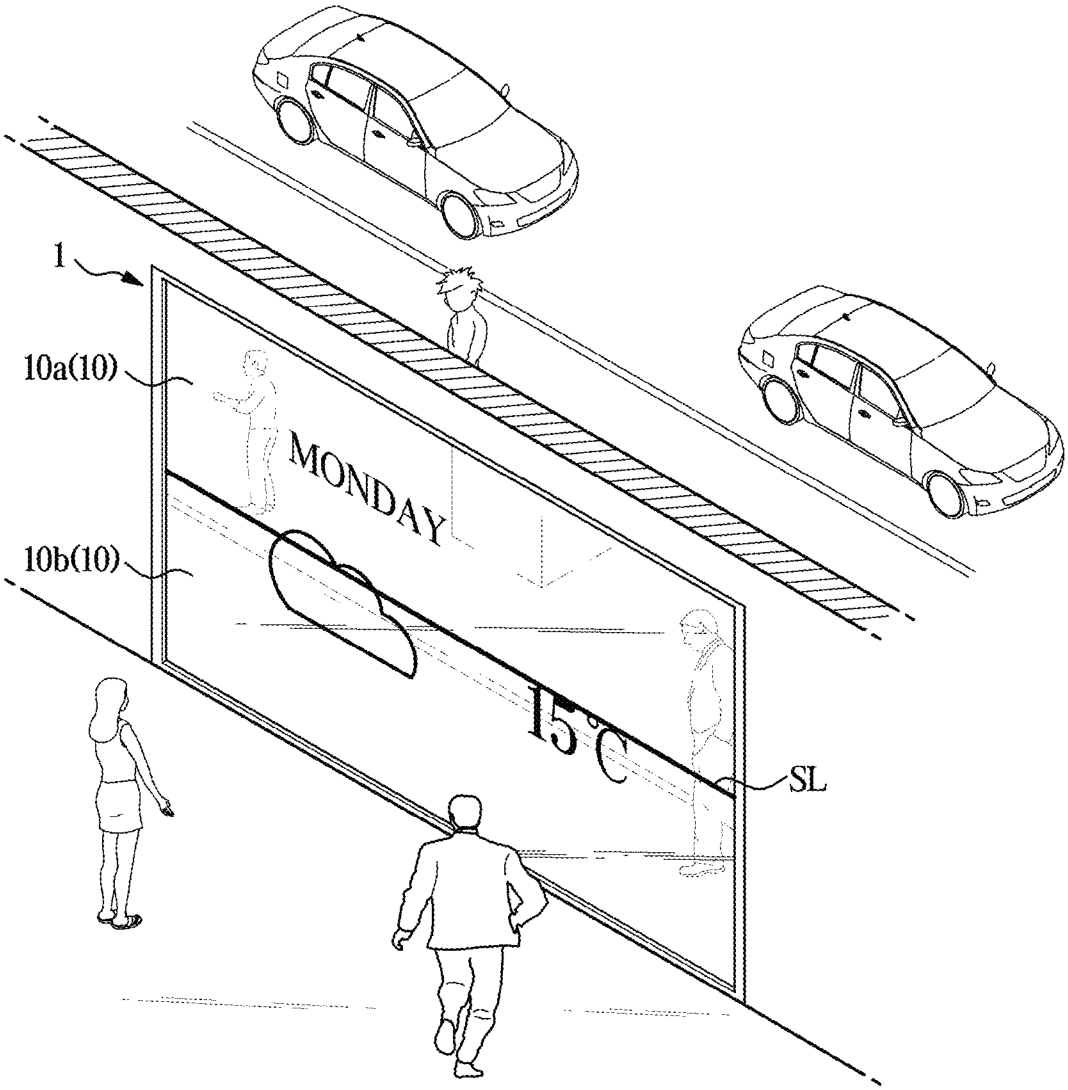

FIG. 9 is a diagram illustrating an example of a seam line formed near a boundary line in a case where a luminance of boundary pixels adjacent to the boundary line is not compensated for.

Referring to FIG. 9, as described above, the distance between the same light-emitting elements of adjacent pixels included in each display module may be different from the distance between the same light-emitting elements of pixels adjacent to the boundary line BL. Accordingly, in a case where a luminance of the pixels adjacent to the boundary line BL is not compensated for, a seam line SL may be visible near the boundary line BL due to luminance unevenness.

For example, in a case where the second blue sub-pixel distance DB' is smaller than the first blue sub-pixel distance DB, a distance between the blue light-emitting elements 120B is relatively close to the boundary line BL, and thus a blue seam line SL may be visible in an image.

Accordingly, a luminance of the boundary pixels adjacent to the boundary line BL is required to be compensated for based on a luminance of the internal area pixels. Hereinafter, compensation of the luminance of the boundary pixels adjacent to the boundary line BL based on the luminance of the internal area pixels is described in detail.

Figure 10:
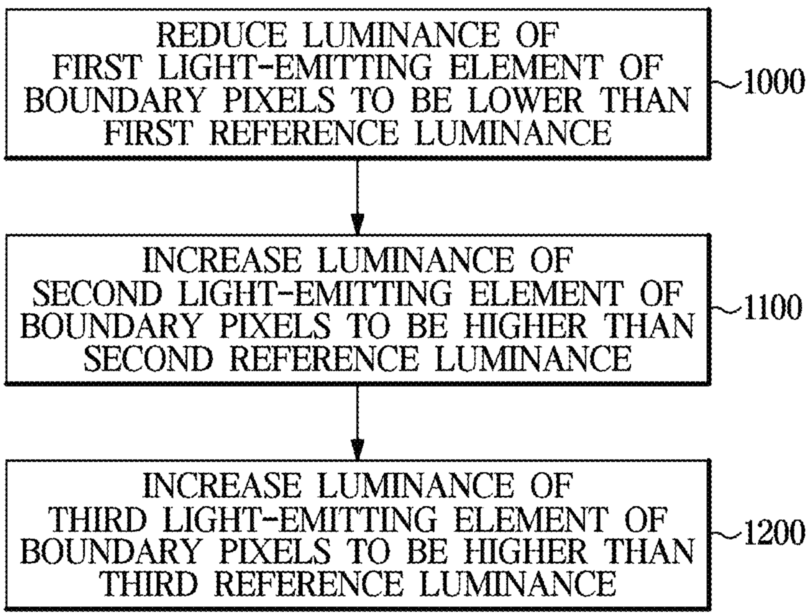
FIG. 10 is a flowchart of a method for controlling a display apparatus according to an embodiment of the disclosure.

FIG. 10 is a flowchart of a method for controlling a display apparatus according to an embodiment.

In an embodiment, the controller 300 may control a plurality of first pixels and a plurality of second pixels based on image data.

The controlling the plurality of first pixels and the plurality of second pixels based on the image data by the controller 300 may include obtaining image data corresponding to a source signal by the main controller 310, and processing the image data to obtain pixel data having a defined gray level and transmitting the obtained pixel data to each of the display modules 10 by the timing controller 320 to control a luminance of each of the plurality of light-emitting elements 120.

The blue light-emitting element 120B may be referred to as a first light-emitting element, and a reference luminance of the blue light-emitting element 120B may be referred to as a first reference luminance.

The green light-emitting element 120G may be referred to as a second light-emitting element, and a reference luminance of the green light-emitting element 120G may be referred to as a second reference luminance.

The red light-emitting element 120R may be referred to as a third light-emitting element, and a reference luminance of the red light-emitting element 120R may be referred to as a third reference luminance.

However, the ordinal numbers, i.e., the first, second, and third, are not limited by the type of light-emitting element in a pixel or the order of light-emitting elements arranged in the pixel.

For example, in a case where only the blue light-emitting element 120B and the red light-emitting element 120R are included in a pixel, the red light-emitting element 120R may be referred to as a second light-emitting element, and a reference luminance of the red light-emitting element 120R may be referred to as a second reference luminance.

In another example, in a case where the red light-emitting element 120R is positioned at the second location L2 (see FIG. 8) and the green light-emitting element 120G is positioned at the third location L3 (see FIG. 8), the red light-emitting element 120R may be referred to as a second light-emitting element, a reference luminance of the red light-emitting element 120R may be referred to as a second reference luminance, the green light-emitting element 120G may be referred to as a third light-emitting element, and a reference luminance of the green light-emitting element 120G may be referred to as a third reference luminance.

However, hereinafter, for convenience of description, the blue light-emitting element 120B is referred to as a first light-emitting element, a reference luminance of the blue light-emitting element 120B is referred to as a first reference luminance, the green light-emitting element 120G is referred to as a second light-emitting element, a reference luminance of the green light-emitting element 120G is referred to as a second reference luminance, the red light-emitting element 120R is referred to as a third light-emitting element, and a reference luminance of the red light-emitting element 120R is referred to as a third reference luminance.

In various embodiments, the controller 300 may decrease (reduce) or increase a luminance of the light-emitting element 120 to be lower or to be higher than a reference luminance of the light-emitting element 120 which is determined based on image data.

In an embodiment, the controller 300 may reduce the luminance of the first light-emitting element 120B to be lower than the first reference luminance of the first light-emitting element 120B determined based on the image data (1000).

For example, the controller 300 may process the image data to obtain B color data, determine a gray level of the B color data as the first reference luminance, and reduce the gray level of the B color data corresponding to the first light-emitting elements 120B of the first boundary pixels P11 and the second boundary pixels P21.

In an embodiment, the controller 300 may increase a luminance of the second light-emitting element 120G to be higher than the second reference luminance of the second light-emitting element 120G determined based on the image data (1100).

For example, the controller 300 may process the image data to obtain G color data, determine a gray level of the G color data as the second reference luminance, and increase the gray level of the G color data corresponding to the second light-emitting elements 120G of the first boundary pixels P11 and the second boundary pixels P21.

In an embodiment, the controller 300 may increase a luminance of the third light-emitting element 120R to be higher than the third reference luminance of the third light-emitting element 120R determined based on the image data (1200).

For example, the controller 300 may process the image data to obtain R color data, determine a gray level of the R color data as the third reference luminance, and increase the gray level of the R color data corresponding to the third light-emitting elements 120R of the first boundary pixels P11 and the second boundary pixels P21.

In an embodiment, the controller 300 may reduce the luminance of the first light-emitting element 120B of the first boundary pixel P11 to be lower than the first reference luminance by a first ratio.

The first ratio may be preset based on a first measured luminance of the first internal area pixel P12 measured by the external measuring device 450 (see FIG. 4) and a second measured luminance of the first light-emitting element 120B of the first boundary pixel P11 measured by the external measurement device 450. The first measured luminance may include a measured luminance corresponding to the first light-emitting element 120B of the first internal area pixel P12.

For example, in a case where the second measured luminance is 1.2 times greater than the first measured luminance, the first ratio may be 1.2 times. Accordingly, in this case, the controller 300 may reduce a grayscale of the B color data corresponding to the first light-emitting element 120B of each of the first boundary pixels P11 and the second boundary pixels P21 by 1.2 times.

The first ratio may be preset in proportion to a difference between the first measured luminance and the second measured luminance.

For example, the greater the difference between the first measured luminance and the second measured luminance, the greater the first ratio may be set, and thus, as the difference between the first measured luminance and the second measured luminance increases, the controller 300 may reduce the grayscale of the B color data corresponding to the first light-emitting element 120B of each of the first boundary pixels P11 and the second boundary pixels P21 by the first ratio set to be great.

In an embodiment, the controller 300 may increase the luminance of the second light-emitting element 120G of the first boundary pixel P11 to be higher than the second reference luminance by a second ratio.

The second ratio may be preset based on a third measured luminance of the first internal area pixel P12 measured by the external measurement device 450 and a fourth measured luminance of the second light-emitting element 120G of the first boundary pixel P11 measured by the external measurement device 450. The third measured luminance may include a measured luminance corresponding to the second light-emitting element 120G of the first internal area pixel P12.

For example, in a case where the fourth measured luminance is 1.5 times smaller than the third measured luminance, the second ratio may be 1.5 times. Accordingly, in this case, the controller 300 may increase a grayscale of the G color data corresponding to the second light-emitting element 120G of each of the first boundary pixels P11 and the second boundary pixels P21 by 1.5 times.

The second ratio may be preset in proportion to a difference between the third measured luminance and the fourth measured luminance.

For example, the greater the difference between the third measured luminance and the fourth measured luminance, the greater the second ratio may be set, and thus, as the difference between the third measured luminance and the fourth measured luminance increases, the controller 300 may increase the grayscale of the G color data corresponding to the second light-emitting element 120G of each of the first boundary pixels P11 and the second boundary pixels P21 by the second ratio set to be great.

In an embodiment, the controller 300 may increase a luminance of the third light-emitting element 120R of the first boundary pixel P11 to be higher than the third reference luminance by a third ratio.

The third ratio may be preset based on a fifth measured luminance of the first internal area pixel P12 measured by the external measurement device 450 and a sixth measured luminance of the third light-emitting element 120R of the first boundary pixel P11 measured by the external measurement device 450. The fifth measured luminance may include a measured luminance corresponding to the third light-emitting element 120R of the first internal area pixel P12.

For example, in a case where the sixth measured luminance is 1.7 times smaller than the fifth measured luminance, the third ratio may be 1.7 times. Accordingly, in this case, the controller 300 may increase a grayscale of the R color data corresponding to the third light-emitting element 120R of each of the first boundary pixels P11 and the second boundary pixels P21 by 1.7 times.

The third ratio may be preset in proportion to a difference between the fifth measured luminance and the sixth measured luminance.

For example, the greater the difference between the fifth measured luminance and the sixth measured luminance, the greater the third ratio may be set, and thus, as the difference between the fifth measured luminance and the sixth measured luminance increases, the controller 300 may increase the grayscale of the R color data corresponding to the third light-emitting element 120R of each of the first boundary pixels P11 and the second boundary pixels P21 by the third ratio set to be great.

The third ratio may be set to be greater than the second ratio.

For example, the luminance of the third light-emitting elements 120R of the first boundary pixels P11 and the second boundary pixels P21 may be increased by a greater ratio than the luminance of the second light-emitting elements 120G of the first boundary pixels P11 and the second boundary pixels P21.

Figure 11:
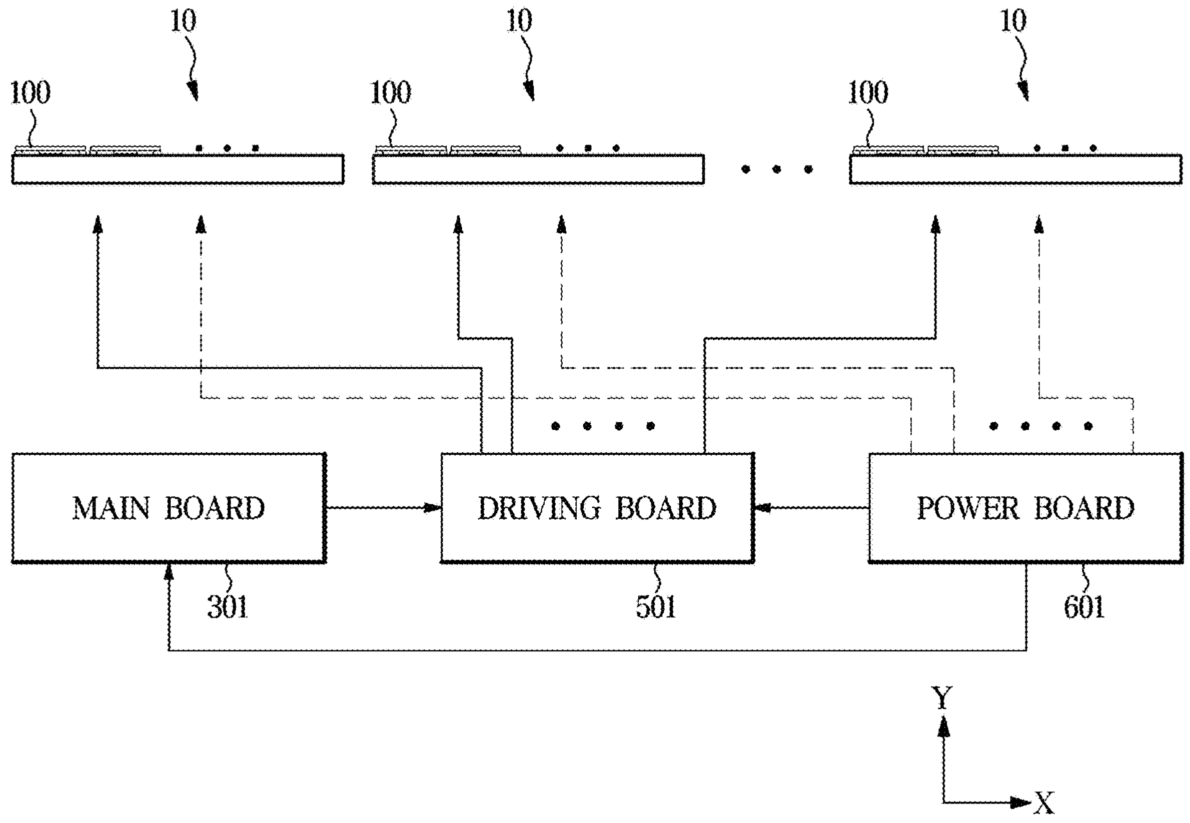
FIG. 11 is a diagram illustrating a display apparatus implemented by a plurality of display modules according to an embodiment of the disclosure.

FIG. 11 is a diagram illustrating a display apparatus implemented by a plurality of display modules according to an embodiment.

The display apparatus 1 may be implemented by combining the plurality of display modules 10 according to the above embodiment.

As described above, each of the plurality of display modules 10 may include the driver IC 200 that drives the display panel 100. The driver IC 200 may be electrically connected to the display panel 100 by employing one of various bonding methods, such as Chip on Film (COF) bonding, Film on Glass (FOG) bonding, Chip on Glass (COG) bonding, or Tape Automated Bonding (TAB).

For example, the display panel 100 may be connected to a Flexible Printed Circuit Board (FPCB) by a film on which the driver IC 200 is mounted. The FPCB may be connected to a driving board 501 to electrically connect the display module 10 to the driving board 501.

The timing controller 320 may be provided on the driving board 501. Accordingly, the driving board 501 may also be referred to as a T-con board. The plurality of display modules 10 may receive various data from the driving board 501.

In addition, the display apparatus 1 may further include a main board 301 and a power board 601. The main controller 310 may be provided on the main board 301, and power circuitry required to supply power to the plurality of display modules 10 may be provided on the power board 601.

The power board 601 may be electrically connected to the plurality of display modules (10-1, 10-2, . . . , 10-*n*) through the FPCB, and may supply power voltage $V_{DD}$, reference voltage $V_{SS}$, various operating power, and the like, to the plurality of display modules 10 connected through the FPCB.

In the above-described example, although it has been described that the plurality of display modules 10 share the driving board 501, a separate driving board 501 may be connected to each display module 10. Alternatively, the plurality of display modules 10 may be grouped, and each group may be connected to one driving board 501.

Figure 12:
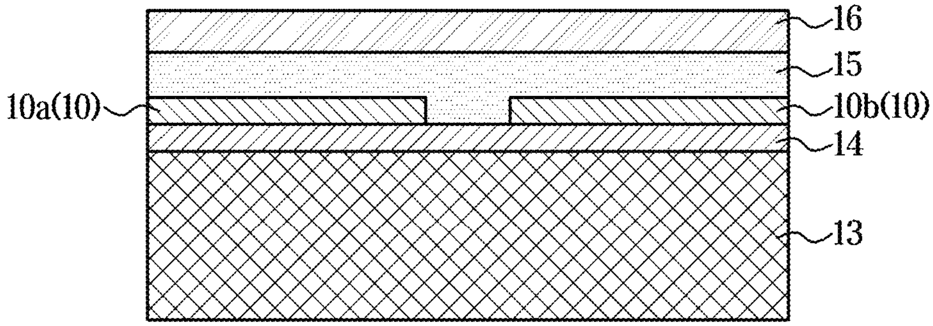
FIG. 12 and FIG. 13 are diagram for illustrating a method of tiling a plurality of display modules according to an embodiment of the disclosure.
Figure 13:
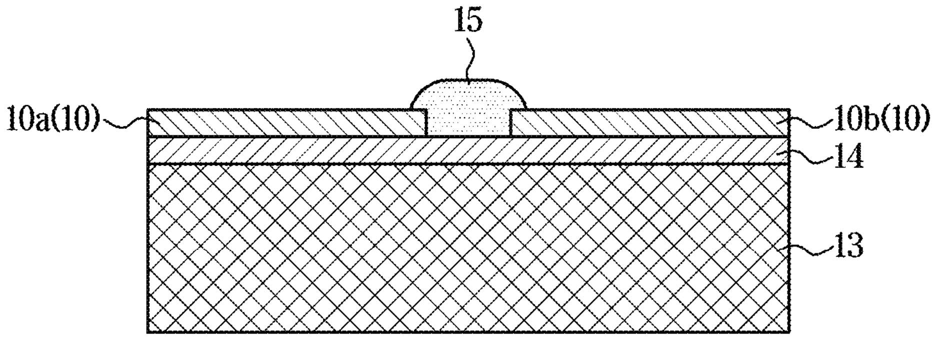

FIG. 12 and FIG. 13 are diagram for illustrating a method of tiling a plurality of display modules according to an embodiment.

Referring to FIG. 12 and FIG. 13, the display apparatus 1 according to an embodiment may include a transparent substrate 13, a first film layer 14, the first display module 10*a*, the second display module 10*b*, a resin layer 15, and/or a second film layer 16.

The transparent substrate 13 may be implemented as one of various substrates, such as a silicon substrate, glass substrate, plastic substrate, PCB, FPCB, cavity substrate, etc. As long as the transparent substrate 13 may be implemented as transparent, and the material thereof is not limited.

The first film layer 14 may be disposed on an upper side of the transparent substrate 13. The first film layer 14 may include an Optically Clear Adhesive (OCA) type film to minimize an air gap between the transparent substrate 13 and the display module 10.

The first display module 10*a* and the second display module 10*b* may be disposed on the first film layer 14.

The resin layer 15 may be arranged between the first display module 10*a* and the second display module 10*b*, and may also be arranged on an upper side of the first display module 10*a* and an upper side of the second display module 10*b*. The resin layer 15 may include a resin for tiling the first display module 10*a* and the second display module 10*b*.

The second film layer 16 may be arranged on an upper side of the resin layer 15. The second film layer 16 may include a low-reflection film for minimizing reflection of light incident from the outside of the display apparatus 1.

Referring to FIG. 13, in existing display apparatuses, the resin layer 15 is disposed only between the display modules 10, and thus in a case where a low-reflection film is attached on the display module 10, an air gap occurs between the display module 10 and the low-reflection film.

Referring to FIG. 12, in the display apparatus 1 according to an embodiment, by flattening the resin layer 15, the resin layer 15 may be formed at the same height in an area between the display modules 10 and in an area corresponding to the upper side of each display module 10. Accordingly, even in a case where a low-reflection film is attached on the display modules 10, an air gap may be prevented from occurring.

Figure 14:
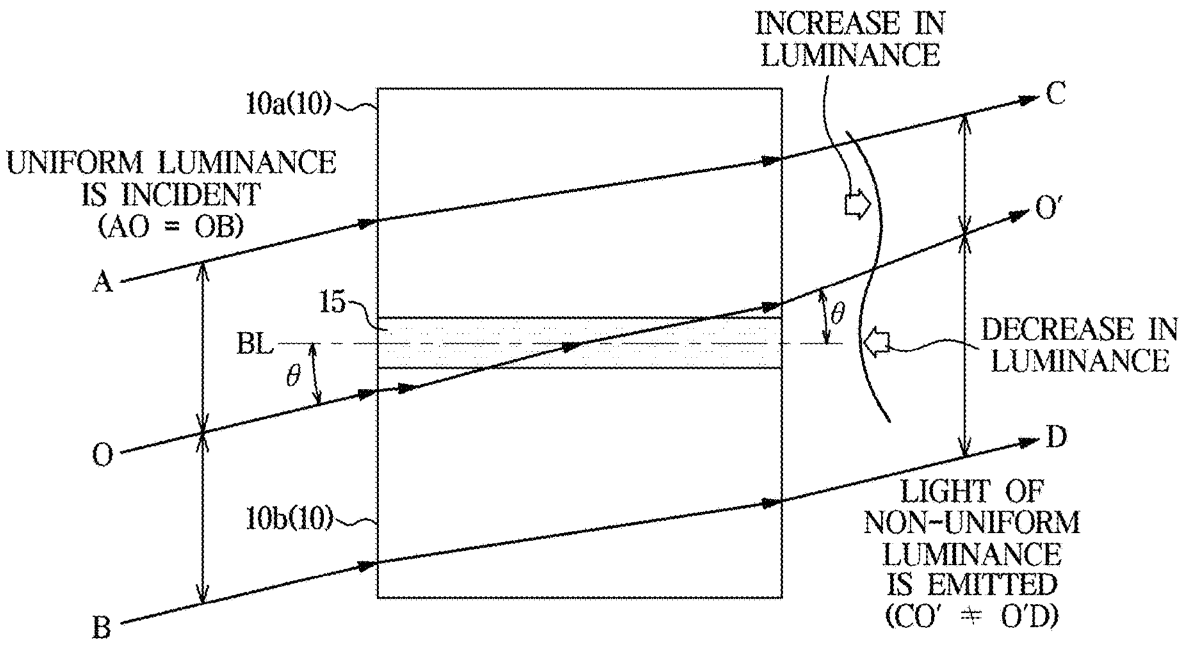
FIG. 14 and FIG. 15 are diagram for illustrating a method of minimizing a difference between a luminance of light incident on a plurality of display modules and a luminance of light passing through the plurality of display modules.
Figure 15:
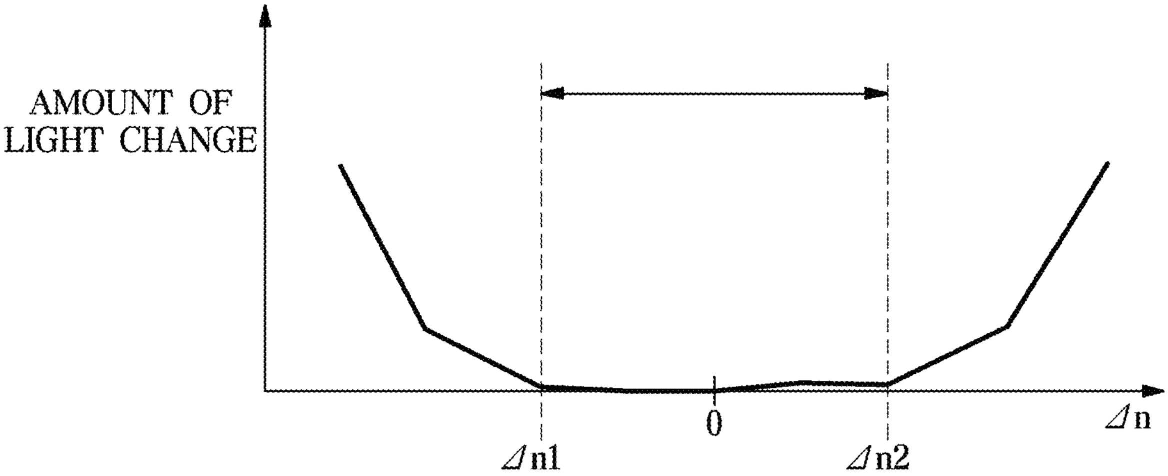

FIG. 14 and FIG. 15 are diagram for illustrating a method of minimizing a difference between a luminance of light incident on a plurality of display modules and a luminance of light passing through the plurality of display modules.

Referring to FIG. 14 and FIG. 15, because the display apparatus 1 is a transparent display apparatus, a luminance of light incident on the display apparatus 1 and a luminance of light emitted from the display apparatus 1 are required to be maintained uniformly.

In FIG. 14, even though light of a uniform luminance (AO=OB) is incident on the display apparatus 1, light may be refracted by the various components included in the display module 10 and the resin layer 15 between the display modules 10, and thus light of non-uniform luminance (CO'≠O'D) may be emitted.

However, referring to FIG. 15, by appropriately setting a refractive index of the resin layer 15, a difference between the luminance of light incident on the display apparatus 1 and the luminance of light emitted from the display apparatus 1 may be minimized.

For example, in a case where a difference between the refractive index of the resin layer 15 and a reference refractive index (e.g., 1.51) is set between $\Delta n1$ and $\Delta n2$, the difference between the luminance of light incident on the display apparatus 1 and the luminance of light emitted from the display apparatus 1 may be minimized.

According to the disclosure, a display apparatus may include: a first display module including a plurality of first pixels; a second display module including a plurality of second pixels and configured to be adjacent to the first display module based on a defined boundary line; and a controller configured to control the plurality of first pixels and the plurality of second pixels based on image data, wherein the plurality of first pixels include first boundary pixels adjacent to the boundary line, the plurality of second pixels include second boundary pixels adjacent to the boundary line, the first boundary pixels and the second boundary pixels each include a plurality of light-emitting elements, the plurality of light-emitting elements include a first light-emitting element disposed at a first location closest to the boundary line and configured to output light of a first color, and a second light-emitting element disposed at a second location that is further from the boundary line than the first location and configured to output light of a second color, and the controller is configured to reduce a luminance of the first light-emitting element to be lower than a first reference luminance of the first light-emitting element determined based on the image data, and to increase a luminance of the second light-emitting element to be higher than a second reference luminance of the second light-emitting element determined based on the image data.

The plurality of first pixels may include first internal area pixels disposed in a first internal area adjacent to a first boundary area formed by the first boundary pixels, and the plurality of second pixels may include second internal area pixels disposed in a second internal area adjacent to a second boundary area formed by the second boundary pixels.

The first display module may include a first driver integrated circuit (IC) disposed in a first bezel area adjacent to the first internal area, and the second display module may include a second driver IC disposed in a second bezel area adjacent to the second internal area.

The first boundary pixels and the first internal area pixels may be configured to be arranged in a vertical direction based on the boundary line, and the second boundary pixels and the second internal area pixels may be configured to be arranged in a vertical direction based on the boundary line.

The controller may be configured to reduce the luminance of the first light-emitting element to be lower than the first reference luminance by a first ratio, and increase the luminance of the second light-emitting element to be higher than the second reference luminance by a second ratio.

The first ratio may be preset based on a first measured luminance of the first internal area pixels measured by an external measurement device and a second measured luminance of the first light-emitting element measured by the external measurement device, and the second ratio may be preset based on a third measured luminance of the first internal area pixels measured by the external measurement device and a fourth measured luminance of the second light-emitting element measured by the external measurement device.

The first ratio may be preset in proportion to a difference between the first measured luminance and the second measured luminance, and the second ratio may be preset in proportion to a difference between the third measured luminance and the fourth measured luminance.

The plurality of light-emitting elements may further include a third light-emitting element disposed at a third location that is further from the boundary line than the second location and configured to output light of a third color.

The controller may be configured to: increase a luminance of the third light-emitting element to be higher than a third reference luminance of the third light-emitting element determined based on the image data, and reduce the luminance of the first light-emitting element to be lower than the first reference luminance by a first ratio, increase the luminance of the second light-emitting element to be higher than the second reference luminance by a second ratio, and increase the luminance of the third light-emitting element to be higher than the third reference luminance by a third ratio.

The third ratio may be greater than the second ratio.

The plurality of light-emitting elements may further include a third light-emitting element disposed at a third location that is closer to the boundary line than the second location and further from the boundary line than the first location, and configured to output light of a third color.

The controller may be configured to: increase a luminance of the third light-emitting element to be higher than a third reference luminance of the third light-emitting element determined based on the image data, and reduce the luminance of the first light-emitting element to be lower than the first reference luminance by a first ratio, increase the luminance of the second light-emitting element to be higher than the second reference luminance by a second ratio, and increase the luminance of the third light-emitting element to be higher than the third reference luminance by a third ratio.

The second ratio may be greater than the third ratio.

The second display module may be the first display module rotated 180 degrees.

The first light-emitting element may be a blue light-emitting element, and the second light-emitting element may be a green light-emitting element or a red light-emitting element.

According to the disclosure, in a method for controlling a display apparatus including a first display module including a plurality of first pixels that include first boundary pixels adjacent to a defined boundary line, and a second display module adjacent to the first display module based on the boundary line and including a plurality of second pixels that include second boundary pixels adjacent to the boundary line, wherein the first boundary pixels and the second boundary pixels each include a plurality of light-emitting elements including a first light-emitting element disposed at a first location closest to the boundary line and configured to output light of a first color, and a second light-emitting element disposed at a second location that is further from the boundary line than the first location and configured to output light of a second color, the method may include: controlling the plurality of first pixels and the plurality of second pixels based on image data, wherein the controlling of the plurality of first pixels and the plurality of second pixels based on the image data may include reducing a luminance of the first light-emitting element to be lower than a first reference luminance of the first light-emitting element determined based on the image data, and increasing a luminance of the second light-emitting element to be higher than a second reference luminance of the second light-emitting element determined based on the image data.

The plurality of first pixels may include first internal area pixels disposed in a first internal area adjacent to a first boundary area formed by the first boundary pixels, and the plurality of second pixels may include second internal area pixels disposed in a second internal area adjacent to a second boundary area formed by the second boundary pixels.

The first display module may include a first driver integrated circuit (IC) disposed in a first bezel area adjacent to the first internal area, and the second display module may include a second driver IC disposed in a second bezel area adjacent to the second internal area.

The first boundary pixels and the first internal area pixels may be configured to be arranged in a vertical direction based on the boundary line, and the second boundary pixels and the second internal area pixels may be configured to be arranged in a vertical direction based on the boundary line.

The reducing of the luminance of the first light-emitting element to be lower than the first reference luminance and the increasing of the luminance of the second light-emitting element to be higher than the second reference luminance may include reducing the luminance of the first light-emitting element to be lower than the first reference luminance by a first ratio, and increasing the luminance of the second light-emitting element to be higher than the second reference luminance by a second ratio.

The first ratio may be preset based on a first measured luminance of the first internal area pixels measured by an external measurement device and a second measured luminance of the first light-emitting element measured by the external measurement device, and the second ratio may be preset based on a third measured luminance of the first internal area pixels measured by the external measurement device and a fourth measured luminance of the second light-emitting element measured by the external measurement device.

The first ratio may be preset in proportion to a difference between the first measured luminance and the second measured luminance, and the second ratio may be preset in proportion to a difference between the third measured luminance and the fourth measured luminance.

The plurality of light-emitting elements may further include a third light-emitting element disposed at a third location that is further from the boundary line than the second location and configured to output light of a third color.

The reducing of the luminance of the first light-emitting element to be lower than the first reference luminance and the increasing of the luminance of the second light-emitting element to be higher than the second reference luminance may include reducing the luminance of the first light-emitting element to be lower than the first reference luminance by a first ratio and increasing the luminance of the second light-emitting element to be higher than the second reference luminance by a second ratio, and may further include increasing a luminance of the third light-emitting element to be higher than a third reference luminance of the third light-emitting element determined based on the image data, and increasing the luminance of the third light-emitting element to be higher than the third reference luminance by a third ratio.

The third ratio may be greater than the second ratio.

The plurality of light-emitting elements may further include a third light-emitting element disposed at a third location that is closer to the boundary line than the second location and further from the boundary line than the first location and configured to output light of a third color.

The reducing of the luminance of the first light-emitting element to be lower than the first reference luminance and the increasing of the luminance of the second light-emitting element to be higher than the second reference luminance may include reducing the luminance of the first light-emitting element to be lower than the first reference luminance by a first ratio and increasing the luminance of the second light-emitting element to be higher than the second reference luminance by a second ratio, and may further include increasing a luminance of the third light-emitting element to be higher than a third reference luminance of the third light-emitting element determined based on the image data, and increasing the luminance of the third light-emitting element to be higher than the third reference luminance by a third ratio.

The second ratio may be greater than the third ratio.

The second display module may be the first display module rotated 180 degrees.

The first light-emitting element may be a blue light-emitting element, and the second light-emitting element may be a green light-emitting element or a red light-emitting element.

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may be read only memory (ROM), random access memory (RAM), a magnetic tape, a magnetic disc, a flash memory, an optical data storage device, etc.

The computer-readable recording medium may be provided in the form of a non-transitory storage medium, wherein the term 'non-transitory storage medium' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

The method according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed (e.g., download or upload) through an application store (e.g., Play Store™) online or directly between two user devices (e.g., smartphones). In the case of online distribution, at least a portion of the computer program product (e.g., downloadable app) may be stored at least semi-permanently or may be temporarily generated in a storage medium, such as a memory of a server of a manufacturer, a server of an application store, or a relay server.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

The invention claimed is:

1. A display apparatus, comprising:

a first display module including a plurality of first pixels;

a second display module including a plurality of second pixels, and arranged adjacent to the first display module with a boundary line between the first display module and the second display module; and a controller configured to control the plurality of first pixels and the plurality of second pixels based on image data, wherein the plurality of first pixels includes a plurality of first boundary pixels adjacent to the boundary line, the plurality of second pixels includes a plurality of second boundary pixels adjacent to the boundary line, each first boundary pixel of the plurality of first boundary pixels and each second boundary pixel of the plurality of second boundary pixels includes a plurality of light-emitting elements including:

a first light-emitting element disposed at a first location closest to the boundary line and configured to output light of a first color, and a second light-emitting element disposed at a second location that is further from the boundary line than the first location and configured to output light of a second color, and the controller is configured to:

reduce a luminance of the first light-emitting element to be lower than a reference luminance of the first light-emitting element determined based on the image data, and increase a luminance of the second light-emitting element to be higher than a reference luminance of the second light-emitting element determined based on the image data.

2. The display apparatus of claim 1, wherein the plurality of light-emitting elements includes:

a third light-emitting element disposed at a third location that is further from the boundary line than the second location and configured to output light of a third color, the controller is configured to:

increase a luminance of the third light-emitting element to be higher than a reference luminance of the third light-emitting element determined based on the image data, and reduce the luminance of the first light-emitting element to be lower than the reference luminance of the first light-emitting element by a first ratio, increase the luminance of the second light-emitting element to be higher than the reference luminance of the second light-emitting element by a second ratio, and increase the luminance of the third light-emitting element to be higher than the reference luminance of the third light-emitting element by a third ratio, and the third ratio is greater than the second ratio.

3. The display apparatus of claim 1, wherein the plurality of light-emitting elements includes:

a third light-emitting element disposed at a third location that is closer to the boundary line than the second location and further from the boundary line than the first location and configured to output light of a third color, the controller is configured to:

increase a luminance of the third light-emitting element to be higher than a reference luminance of the third light-emitting element determined based on the image data, and reduce the luminance of the first light-emitting element to be lower than the reference luminance of the first light-emitting element by a first ratio, increase the luminance of the second light-emitting element to be higher than the reference luminance of the second light-emitting element by a second ratio, and increase the luminance of the third light-emitting element to be higher than the reference luminance of the third light-emitting element by a third ratio, and the second ratio is greater than the third ratio.

4. The display apparatus of claim 1, wherein the second display module has a same configuration as the first display module, and the second display module has an orientation, relative to the first display module, that is rotated 180 degrees about a front to back axis through a center of the second display module, so as to be arranged end to end with the first display module.

5. The display apparatus of claim 1, wherein the first light-emitting element is a blue light-emitting element, and the second light-emitting element is a green light-emitting element or a red light-emitting element.

6. The display apparatus of claim 1, wherein the plurality of first boundary pixels form a first boundary area, the plurality of first pixels includes a plurality of first internal area pixels disposed in a first internal area adjacent to the first boundary area, the plurality of second boundary pixels form a second boundary area, and the plurality of second pixels includes a plurality of second internal area pixels disposed in a second internal area adjacent to the second boundary area.

7. The display apparatus of claim 6, wherein the first display module includes:

a first bezel area adjacent to the first internal area, and a first driver integrated circuit (IC) disposed in the first bezel area, and the second display module includes:

a second bezel area adjacent to the second internal area, and a second driver IC disposed in the second bezel area.

8. The display apparatus of claim 6, wherein the plurality of first boundary pixels and the plurality of first internal area pixels are arranged in a vertical direction with the plurality of first boundary pixels between the boundary line and the plurality of first internal area pixels, and the plurality of second boundary pixels and the plurality of second internal area pixels are arranged in a vertical direction with the plurality of second boundary pixels between the boundary line and the plurality of second internal area pixels.

9. The display apparatus of claim 6, wherein the controller is configured to:

reduce the luminance of the first light-emitting element to be lower than the reference luminance of the first light-emitting element by a first ratio, and increase the luminance of the second light-emitting element to be higher than the reference luminance of the second light-emitting element by a second ratio, the first ratio is preset based on a first measured luminance of the plurality of first internal area pixels measured by an external measurement device and a second measured luminance of the first light-emitting element measured by the external measurement device, and the second ratio is preset based on a third measured luminance of the plurality of first internal area pixels measured by the external measurement device and a fourth measured luminance of the second light-emitting element measured by the external measurement device.

10. The display apparatus of claim 9, wherein the first ratio is preset in proportion to a difference between the first measured luminance and the second measured luminance, and the second ratio is preset in proportion to a difference between the third measured luminance and the fourth measured luminance.

11. A method of controlling a display apparatus including a first display module including a plurality of first pixels, a second display module including a plurality of second pixels, and arranged adjacent to the first display module with a boundary line between the first display module and the second display module, wherein the plurality of first pixels includes a plurality of first boundary pixels adjacent to the boundary line, the plurality of second pixels includes a plurality of second boundary pixels adjacent to the boundary line, and wherein each first boundary pixel of the plurality of first boundary pixels and each second boundary pixel of the plurality of second boundary pixels includes a plurality of light-emitting elements including a first light-emitting element disposed at a first location closest to the boundary line and configured to output light of a first color, and a second light-emitting element disposed at a second location that is further from the boundary line than the first location and configured to output light of a second color, the method comprising:

controlling the plurality of first pixels and the plurality of second pixels based on image data, including reducing a luminance of the first light-emitting element to be lower than a reference luminance of the first light-emitting element determined based on the image data, and increasing a luminance of the second light-emitting element to be higher than a reference luminance of the second light-emitting element determined based on the image data.

12. The method of claim 11, wherein the plurality of first boundary pixels form a first boundary area, the plurality of first pixels includes a plurality of first internal area pixels disposed in a first internal area adjacent to the first boundary area, the plurality of second boundary pixels form a second boundary area, and the plurality of second pixels includes a plurality of second internal area pixels disposed in a second internal area adjacent to the second boundary area.

13. The method of claim 12, wherein the first display module includes a first bezel area adjacent to the first internal area, and a first driver integrated circuit (IC) disposed in the first bezel area, and the second display module includes a second bezel area adjacent to the second internal area, and a second driver IC disposed in the second bezel area.

14. The method of claim 12, wherein the plurality of first boundary pixels and the plurality of first internal area pixels are arranged in a vertical direction with the plurality of first boundary pixels between the boundary line and the plurality of first internal area pixels, and the plurality of second boundary pixels and the plurality of second internal area pixels are arranged in a vertical direction with the plurality of second boundary pixels between the boundary line and the plurality of second internal area pixels.

15. The method of claim 12, wherein the reducing of the luminance of the first light-emitting element to be lower than the reference luminance of the first light-emitting element and the increasing of the luminance of the second light-emitting element to be higher than the reference luminance of the second light-emitting element includes:

reducing the luminance of the first light-emitting element to be lower than the reference luminance of the first light-emitting element by a first ratio, and increasing the luminance of the second light-emitting element to be higher than the reference luminance of the second light-emitting element by a second ratio, the first ratio is preset based on a first measured luminance of the plurality of first internal area pixels measured by an external measurement device and a second measured luminance of the first light-emitting element measured by the external measurement device, and the second ratio is preset based on a third measured luminance of the plurality of first internal area pixels measured by the external measurement device and a fourth measured luminance of the second light-emitting element measured by the external measurement device.

* * * * *